United States Patent
Nelson et al.

(10) Patent No.: US 11,986,852 B2
(45) Date of Patent: May 21, 2024

(54) DRY PRODUCT SPREADER

(71) Applicant: Unverferth Manufacturing Co., Inc., Kalida, OH (US)

(72) Inventors: August Paul Nelson, Hampton, IA (US); Stanley Ray Duncalf, Waverly, IA (US); Michael D. Van Mill, Shell Rock, IA (US)

(73) Assignee: Unverferth Manufacturing Co., Inc., Kalida, OH (US)

( * ) Notice: Subject to any disclaimer, the term of this patent is extended or adjusted under 35 U.S.C. 154(b) by 0 days.

(21) Appl. No.: 17/735,456

(22) Filed: May 3, 2022

(65) Prior Publication Data

US 2022/0355334 A1 Nov. 10, 2022

Related U.S. Application Data

(60) Provisional application No. 63/183,888, filed on May 4, 2021.

(51) Int. Cl.
*B05C 19/04* (2006.01)
*B05C 19/06* (2006.01)

(52) U.S. Cl.
CPC .............. *B05C 19/04* (2013.01); *B05C 19/06* (2013.01)

(58) Field of Classification Search
None
See application file for complete search history.

(56) References Cited

U.S. PATENT DOCUMENTS 3,019,025 A * 1/1962 Young ................... E01C 19/203
                                                                 239/685
3,160,964 A * 12/1964 Boyer ................... E01C 19/203
                                                                 239/657

(Continued)

FOREIGN PATENT DOCUMENTS

DE       26 45 428 A1    4/1978
DE       102 48 613 A1   6/2003

(Continued)

OTHER PUBLICATIONS

International Search Report and Written Opinion issued for International Patent Application No. PCT/US2022/027471 dated Jul. 21, 2022, 14 pages.

*Primary Examiner* — Jethro M. Pence
(74) *Attorney, Agent, or Firm* — Rothwell, Figg, Ernst & Manbeck, P.C.

(57) ABSTRACT

A dry product spreader is provided that includes a bin that includes a bin discharge opening. The dry product spreader further includes a conveyor located at the bottom of the bin. The conveyor is capable of discharging dry product material from the bin through the bin discharge opening. The dry product spreader further includes a spinner assembly for spreading the dry product material and positioned to receive the dry product material from the bin discharge opening. The dry product spreader further includes a material conveyance system to displace dry product material received through the bin discharge opening before the dry product material reaches the spinner assembly. The dry product spreader further includes a distribution manifold configured to receive dry product material displaced by the material conveyance system. The distribution manifold is configured to return dry product material displaced by the material conveyance system to be spread by the spinner assembly.

16 Claims, 29 Drawing Sheets

(56) References Cited

U.S. PATENT DOCUMENTS

| | | | | |
|---|---|---|---|---|
| 3,167,319 A * | 1/1965 | Kerr | E01C 19/203 | 239/674 |
| 3,232,626 A * | 2/1966 | Polzin | A01C 17/00 | 239/685 |
| 3,332,691 A * | 7/1967 | Swenson | E01C 19/203 | 239/666 |
| 3,851,804 A * | 12/1974 | Fyrk | A01C 17/006 | 222/413 |
| 3,889,883 A * | 6/1975 | Anderson | E01C 19/203 | 198/594 |
| 3,979,022 A * | 9/1976 | Whited | G01F 23/226 | 335/274 |
| 4,003,258 A * | 1/1977 | Suzuki | G01F 23/0007 | 73/290 R |
| 4,166,581 A * | 9/1979 | Hetrick | E01C 19/203 | 291/38 |
| 4,277,022 A * | 7/1981 | Holdsworth | G05D 7/0611 | 239/677 |
| 4,283,014 A * | 8/1981 | Devorak | E01C 19/203 | 239/685 |
| 4,367,848 A * | 1/1983 | Ehmke | A01C 17/006 | 239/665 |
| 4,442,979 A * | 4/1984 | Kupper | E01C 19/203 | 239/677 |
| 4,469,210 A * | 9/1984 | Blumer | A01C 17/006 | 193/29 |
| 4,506,804 A * | 3/1985 | Oka | G01F 23/0007 | 222/64 |
| 4,511,090 A * | 4/1985 | Morgan | A01C 15/02 | 239/666 |
| 4,523,280 A * | 6/1985 | Bachman | E01C 19/203 | 701/50 |
| 4,561,595 A * | 12/1985 | van der Lely | A01C 17/00 | 239/687 |
| 4,588,113 A * | 5/1986 | Egerdahl | E01C 19/202 | 222/626 |
| 4,668,074 A * | 5/1987 | Hirozane | G03G 15/0858 | 222/DIG. 1 |
| 4,834,296 A * | 5/1989 | van der Lely | A01C 17/00 | 239/682 |
| 4,934,606 A * | 6/1990 | Grataloup | B65G 31/04 | 222/281 |
| 4,949,906 A * | 8/1990 | Godwin | A01C 23/04 | 239/379 |
| 5,052,627 A * | 10/1991 | Balmer | A01C 15/122 | 239/655 |
| 5,216,462 A * | 6/1993 | Nakajima | G03G 15/0889 | 118/694 |
| 5,643,361 A * | 7/1997 | Wadell | B05C 19/06 | 118/18 |
| 5,740,746 A * | 4/1998 | Ledermann | A01C 7/042 | 111/179 |
| 5,988,535 A * | 11/1999 | Kime | E01H 10/007 | 239/650 |
| 6,068,200 A * | 5/2000 | Kime | E01H 10/007 | 239/176 |
| 6,079,643 A * | 6/2000 | Hoyle | A01C 17/008 | 239/681 |
| 6,197,368 B1 * | 3/2001 | Valenti | B05C 19/06 | 118/308 |
| 6,202,944 B1 * | 3/2001 | McCrory | A01C 15/122 | 239/665 |
| 6,209,808 B1 * | 4/2001 | Anderson | A01C 17/006 | 239/688 |
| 6,446,879 B1 * | 9/2002 | Kime | E01C 19/203 | 239/7 |
| 6,517,281 B1 * | 2/2003 | Rissi | A01C 17/005 | 239/668 |
| 6,702,208 B1 * | 3/2004 | Hadler | A01C 17/001 | 239/668 |
| 6,715,702 B2 | 4/2004 | McPherson et al. | | |
| 6,817,551 B2 * | 11/2004 | Williams | A01C 15/122 | 222/545 |
| 6,905,077 B2 * | 6/2005 | Hoyle | A01C 15/122 | 239/69 |
| 6,932,286 B2 * | 8/2005 | Smith | A01C 15/16 | 239/650 |
| 7,044,408 B2 * | 5/2006 | Schoenfeld | A01C 17/001 | 239/668 |
| 7,306,175 B1 * | 12/2007 | Farmer | E01C 19/203 | 239/650 |
| 7,753,293 B2 * | 7/2010 | Farmer | E01C 19/203 | 111/11 |
| 8,490,897 B1 * | 7/2013 | Magnus | A01C 15/10 | 239/668 |
| 8,777,707 B2 * | 7/2014 | Hoyle | E01C 19/20 | 460/111 |
| 9,206,563 B1 | 12/2015 | Rissi et al. | | |
| 9,493,916 B2 * | 11/2016 | Mercier | E01H 8/10 | |
| 9,649,646 B1 * | 5/2017 | Podoll | A01C 15/122 | |
| 9,738,200 B2 * | 8/2017 | Roberge | A01C 15/006 | |
| 9,781,914 B2 * | 10/2017 | Mercier | B05C 5/02 | |
| 9,907,224 B2 * | 3/2018 | Rosengren | A01C 7/102 | |
| 9,919,636 B2 * | 3/2018 | Roberge | B60P 1/60 | |
| 9,956,899 B2 * | 5/2018 | Roberge | A01C 7/082 | |
| 9,988,780 B2 * | 6/2018 | Kohn | B65D 77/0466 | |
| 10,306,826 B2 * | 6/2019 | Owenby | A01C 17/001 | |
| 10,542,663 B2 * | 1/2020 | Rosengren | A01C 21/005 | |
| 10,760,226 B2 * | 9/2020 | Guntert, Jr. | E01C 19/182 | |
| 11,045,827 B2 * | 6/2021 | Anderson | B05B 9/007 | |
| 11,116,128 B2 | 9/2021 | Stöcklin | | |
| 11,186,958 B2 * | 11/2021 | Guntert, Jr. | B60P 1/38 | |
| 11,198,149 B2 * | 12/2021 | Gray | B05C 19/008 | |
| 11,516,961 B2 * | 12/2022 | Hafvenstein | F15B 11/042 | |
| 11,528,840 B2 * | 12/2022 | Rosengren | A01C 7/06 | |
| 2001/0006196 A1 * | 7/2001 | McCrory | A01C 15/122 | 239/682 |
| 2006/0006256 A1 * | 1/2006 | Smith | A01C 15/16 | 222/626 |
| 2009/0253474 A1 * | 10/2009 | Isaac | A01D 41/1243 | 460/149 |
| 2011/0015832 A1 * | 1/2011 | Hoyle | E01C 19/004 | 701/50 |
| 2011/0042477 A1 * | 2/2011 | Kemmerling | E01C 19/20 | 239/681 |
| 2011/0309170 A1 * | 12/2011 | Weeks | A01C 15/006 | 239/668 |
| 2015/0360881 A1 * | 12/2015 | Roberge | A01C 15/006 | 414/293 |
| 2017/0274397 A1 * | 9/2017 | Podoll | E01C 19/203 | |
| 2017/0339918 A1 * | 11/2017 | Becker | B01F 27/70 | |
| 2018/0235142 A1 | 8/2018 | Schoels | | |
| 2019/0047004 A1 | 2/2019 | Anderson et al. | | |
| 2019/0075718 A1 | 3/2019 | Stöcklin | | |
| 2019/0099779 A1 * | 4/2019 | Farmer | E01C 19/203 | |
| 2019/0223373 A1 * | 7/2019 | Owenby | E01C 19/201 | |
| 2020/0360950 A1 * | 11/2020 | Anderson | B05B 12/12 | |
| 2020/0384496 A1 * | 12/2020 | Gray | B05C 19/06 | |
| 2021/0105933 A1 * | 4/2021 | King | A01M 7/0085 | |
| 2021/0321558 A1 * | 10/2021 | Puichault | A01C 15/006 | |
| 2021/0402427 A1 * | 12/2021 | Gray | B05D 1/12 | |
| 2022/0055064 A1 * | 2/2022 | Gray | A01C 17/008 | |
| 2022/0217900 A1 * | 7/2022 | Boelter | A01C 19/00 | |
| 2022/0264792 A1 * | 8/2022 | Boelter | A01C 17/001 | |

FOREIGN PATENT DOCUMENTS

| | | |
|---|---|---|
| EP | 1995579 A2 | 11/2008 |
| EP | 3721692 A1 | 11/2008 |
| EP | 3 508 047 A1 | 7/2019 |

* cited by examiner

DRY PRODUCT SPREADER

CROSS-REFERENCE TO RELATED APPLICATIONS

This application claims priority to U.S. Application No. 63/183,888, filed May 4, 2021, the entire disclosure of which is incorporated herein by reference.

FIELD OF DISCLOSURE

This disclosure relates generally to farm implements, and more particular, to dry product broadcast spreaders.

BACKGROUND

A current configuration of a dry product broadcast spreader includes a main bin for holding material, as well as a conveyor belt to move the material from the main bin and dispense the material onto a material flow divider that is then spread by two opposing spinner assemblies.

Broadcast spreaders with sectional or variable application width generally use some type of baffles or deflectors to manipulate the material waterfall stream to a specific drop point of the spinner assemblies. The deflectors are located between the conveyor and spinner assembly. One issue with this arrangement is the material distribution evenness, as the material would be concentrated closer to the deflector face which may impact consistent spread distribution. Others units require the material distribution directly from the primary hopper, or from a secondary hopper after the conveyor. In either setup the product is then distributed to a certain position on the spinners. A tradeoff with these systems comes when applying multiple products. Either the multiple materials or products have to be batch blended prior to filling the primary hopper or the application of the multiple products is delayed which could make for an inaccurate application.

If the spreader unit only has a single hopper, then the multiple products must be blended prior to being put in the hopper. While this still allows the application rate (lbs/acre) to vary, it does not allow the ability to change the application rates of the different products independently as they are being applied. For example, portion of a field may need a higher amount of iron or manganese than other portions. With a singular hopper, the blend is a fixed mix that is a best fit for the acres the blended mix amount will cover.

If the unit is equipped with multiple hoppers that meter different products at different rates, the products are metered prior to going into the secondary hopper where the product mix would wait to work through the hopper before being distributed thru the field making for a delayed application of the custom mix. The amount of delay depends on the size of the secondary hopper and the application rate. This would be a complex method for the controller to calculate ahead of the various products and still would rely on consistent flow through the secondary hopper.

Other section width broadcast spreaders utilize two conveyor belts per bin to deliver dry product to the spinner assemblies. These conveyors operate side by side and operate independently of each other and deliver product to a spinner assembly on the same side of the unit, i.e. the left side conveyor delivers product to the left spinner assembly and the right conveyor delivers product to the right spinner assembly. The width of each conveyor is less than half the width of a single conveyor for a given container opening. With independently operated belt conveyors, there comes a higher cost due to the doubling of sealing devices between container and conveyor, and drive components such as motors, drive shafts, bearings, drive sprockets, and conveyor chains; along with additional rate controller devices, i.e. hydraulic valves, sensors, and/or feed gates. Split belt spreaders include a tent or baffle to cover and seal the space between conveyors and their drive components (e.g., chain, sprocket, bearings). The tent, narrower belt, and in some cases narrower feed gate width are not desirable for application of dry products such as lime, poultry litter, or compost that may contain chunks or may bridge, reducing product flow through the feed gate. This makes split belt units less desirable for application of lime, poultry litter, or compost. Making split belt units a less universal product for some end users is challenging to the manufacturer and dealers who then must forecast, order, inventory, and support both single conveyor unit and split belt unit products.

SUMMARY

Embodiments herein provide for improved dry product broadcast spreader performance. For example, embodiments allow for hoppers to be variably metered to match the field's needs and have minimal application delay as the diverted product is returned to the remaining waterfall portion in a couple seconds or less. Embodiments also allow for enhanced control of the application of dry product by the dry product broadcast spreader. The terms dry product broadcast spreader and dry product spreader will be used interchangeably throughout.

Embodiments also allow for the material conveyance system and distribution manifold to be added to and removed from a single conveyor unit with minimal labor, providing flexibility for the manufacturer and dealer. Depending on the application, or on user preference, the material conveyance system can be shut off, allowing full width application of fertilizer. Because the material flow divider allows application of lime, litter, or compost, the end user is provided with product flexibility with little change to the unit.

According to a first aspect, a dry product spreader includes a bin comprising a bin discharge opening. The bin is capable of containing a dry product material. The dry product spreader further includes a conveyor located at the bottom of the bin. The conveyor is capable of discharging dry product material from the bin through the bin discharge opening. The dry product spreader further includes a spinner assembly for spreading the dry product material and positioned to receive the dry product material from the bin discharge opening. The dry product spreader further includes a material conveyance system to displace dry product material received through the bin discharge opening before the dry product material reaches the spinner assembly. The dry product spreader further includes a distribution manifold configured to receive dry product material displaced by the material conveyance system. The distribution manifold is configured to return dry product material displaced by the material conveyance system to be spread by the spinner assembly.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

DETAILED DESCRIPTION

Figure 1:
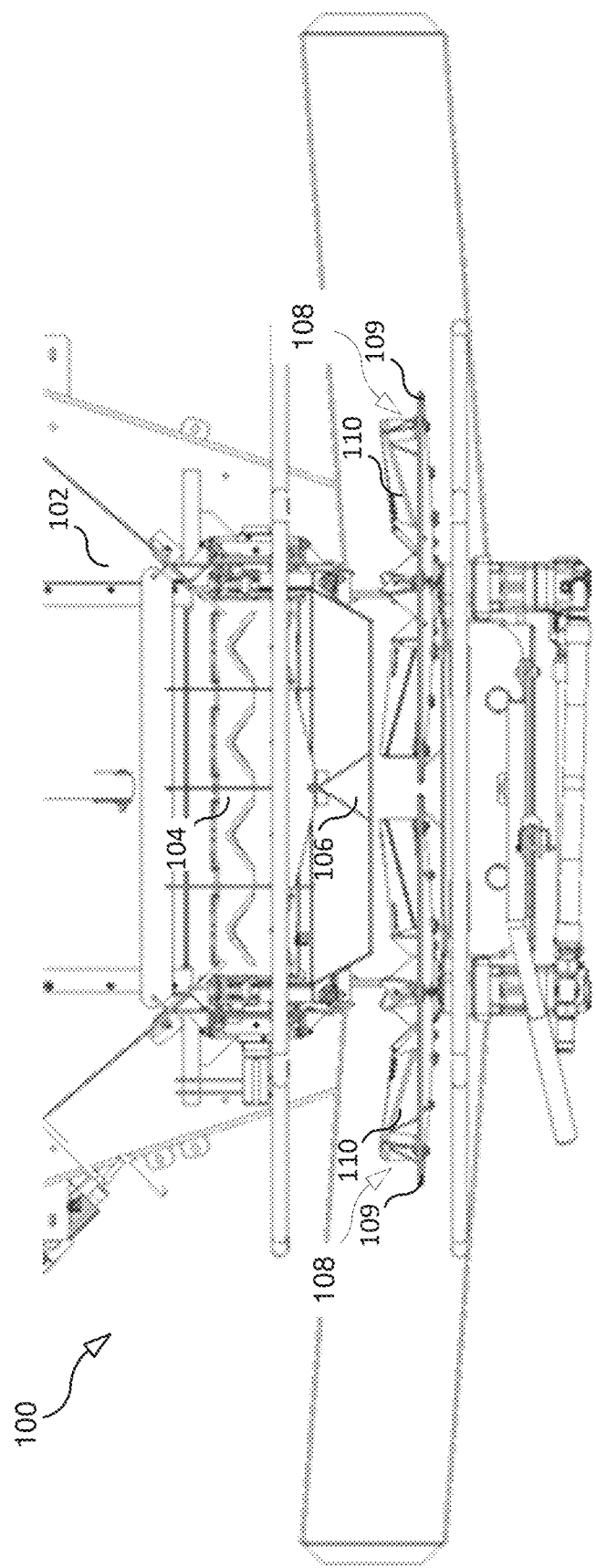
FIG. 1 illustrates a rear view of a dry product spreader.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by persons of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the term "mount" or "mounted" refers to a state where a first component is securely attached to a second component, such that the first component is supported by the second component and is substantially restricted of movement with respect to the second component.

Embodiments provided herein allow multiple hoppers to be variably metered to match the field's needs and have minimal application delay as the diverted product is returned to the remaining waterfall portion in a couple seconds or less.

In a broadcast spreader, the feed gate or door at the back end of hopper and directly above the conveyor typically has a fixed width, e.g. 28" wide. This gate opening width can vary from machine to machine. The height of the feed gate door at the back of the hopper can be adjusted by the operator or by an application rate controller. Feed gate opening (width and height), belt conveyor speed, application spread width, and spreader travel speed determine the application rate, aka pounds per acre. The application rate is the fertilizer volume (feed gate opening and conveyor speed determine volume, product density to determine the pounds) traveling on the conveyor through the feed gate door being spread over the application width and distance travel (spreader application width, spreader speed to determine acre).

Embodiments provided here are for dry granular products such as common agricultural fertilizers, for example, urea and potash, as well as dry micronutrients, such as boron, iron, manganese, and zinc. A fertilizer application rate may have the feed gate or door height of around about 1" to about 3" on the high rate of application for these products. This volume of fertilizer falls from the back of the belt conveyor, like a waterfall, down through a material divider onto the spinners. The spinners then spread (or broadcast) the product over a determined width. This spreader application width typically being from about 60' wide to about 120' wide. An application width of about 60' to about 80' would be for products such as lime powder, poultry litter, or compost, which are products less desirable for embodiments of the proposed swath control system as they can vary in particle size, be high in moisture, easily stick or clump or contain of chunks or rocks. The more targeted products include common fertilizer and micronutrients, which commonly have an application width of about 80' or about 90', up to about 120' width.

In a non-sectional control arrangement, the mentioned 28" wide, 1" to 3" tall, cross section fertilizer volume waterfalls off the back of the conveyor, passes thru a material divider and lands on the spinners to be spread. With embodiments of the proposed swath control system, sections of fertilizer waterfall are diverted (e.g., by air or mechanical conveyance) into a distribution manifold prior to the fertilizer or other dry product material going through a material flow divider. The distribution manifold moves and redirects the diverted fertilizer or other dry product material to a portion of the waterfall that was not diverted to then fall through the material diverter onto the spinners. The altered fertilizer waterfall width onto the spinners makes for an altered and/or reduced spread application width on the ground, which is a goal of this system.

The diverted fertilizer waterfall sections may be divided into, but are not limited to, equal length sections. For example, for a two-section spreader, where each section is equal length and the spreader rear door width is 28" wide, each fertilizer diverted waterfall section would be about 14" wide (=28/2). If eight equal size sections, each fertilizer diverted waterfall section width would be 3.5" wide (=28/8). Using an eight-section scenario, during operation, embodiments may divert as few as one diverted section and as many as seven diverted sections. The fertilizer diverted waterfall sections could be in multiple arrangements based on the desired application. For example, the diverted sections could be only on one side or edge of the fertilizer waterfall. The fertilizer waterfall diverted sections could be three sections from one edge end and two diverted sections from the opposite edge of the fertilizer waterfall. Or three diverted sections somewhere in the middle of the fertilizer waterfall.

Using a two-section example, if embodiments are going to divert fertilizer waterfall sections, the percentage of fertilizer waterfall being diverted would be 50% of the total fertilizer waterfall. If the unit is configured for more than two sections, the percentage of fertilizer being diverted would depend on the number of diverted waterfall sections divided by the total number of sections in the swath control system. Using an eight section swath control example, the number of sections diverted would be at least one section and one section would be 12.5% (=1/8) of the total fertilizer waterfall. If two sections of the eight are being diverted, then the percentage would be 25% (=2/8). If three of the eight sections, then the percentage would be 37.5% (=3/8), and so on.

This discussion so far assumes that the vast majority of the fertilizer or other dry product material in a given activated section is being diverted. It is possible in embodiments to more finely control how much material in a given section is diverted.

When the fertilizer waterfall section or sections are diverted and thereby the spread application width is reduced, the conveyor belt speed may be reduced to maintain the targeted spread application rate, aka pounds per acre. For example, if the conveyor belt speed is not reduced, the fertilizer volume intended to be spread over an application width of 90', would be spread over a narrower spread application width of 75', would result in a higher than desired pounds per acre.

Figure 2:
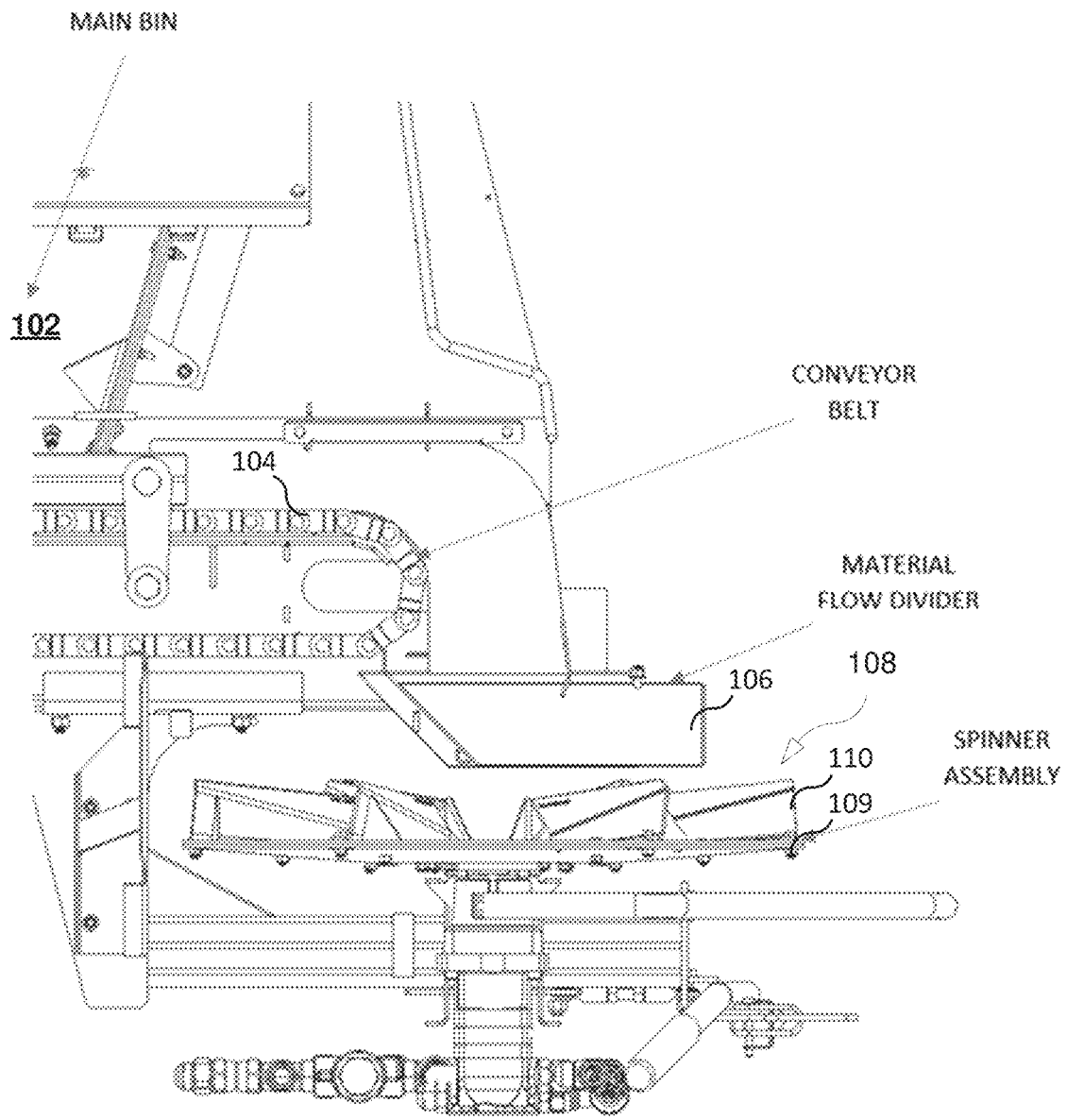
FIG. 2 illustrates a partial side view of a dry product spreader 100, showing some internal features.
Figure 3:
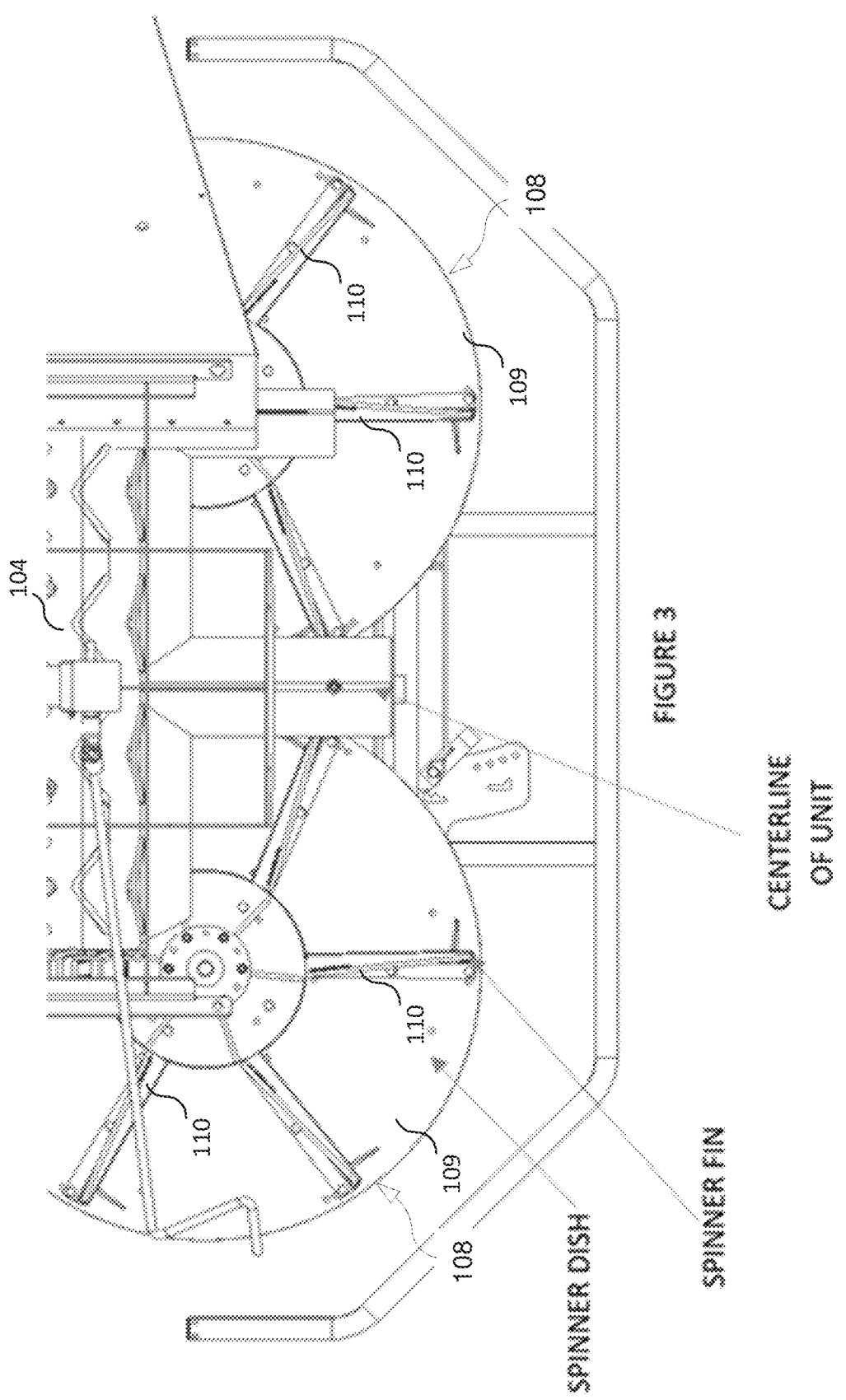
FIG. 3 illustrates a partial top view of a dry product spreader 100.

FIG. 1 illustrates a rear view of a dry product spreader 100. FIG. 2 illustrates a partial side view of a dry product broadcast spreader 100, showing some internal features. FIG. 3 illustrates a partial top view of a dry product spreader 100. With respect to FIGS. 1-3, dry product spreader 100 includes one or more bins 102, capable of containing a dry product that is to be spread by dry product spreader 100. The dry product may include, for example, one or more types of dry fertilizer and cover crop. The bins 102 may include an adjustable feed gate to control the height of the dry product material being removed by the conveyor belt. The adjustable feed gate, in conjunction with the variable conveyor belt speed, determines the volume of the dry product material being sent to the spinner assemblies.

Different bins 102 may contain different dry product, and dry product spreader 100 may be capable of selecting dry product from a particular bin 102 as needed during operation. Dry product spreader 100 also includes a conveyor belt 104, which moves the dry product from the bin 102 toward spinner assemblies 108, and ultimately to be applied, e.g., on the ground or a crop or other target of the dry product. In embodiments, multiple conveyor belts 104 may be employed, e.g. to apply dry product material from multiple bins 102. The dry product spreader 100 is capable of allowing for multiple different dry product materials to be applied, potentially at different application rates. The additional bins 102 can be placed either within a main bin 102, or in proximity to the rear face of the main bin 102. The conveyor belts 104 for these additional bins 102 may be positioned to output the dry product material in the same location of the material flow divider 106 as the main bin conveyor belt 104.

As the dry product leaves the conveyor belt 104, a material flow divider 106 may be present, which splits the dry product between two spinner assemblies 108. The material flow divider 106 is split at the centerline of the dry product spreader 100 to divide (e.g., equally divide) the dry product material between each of the two spinner assemblies 108. The material flow divider 106 distributes the material being dropped off of the conveyor belt 104 evenly across the face of the spinner fins 110 in a designated location. The spinner assemblies 108 include a spinner dish 109, shown as being substantially flat and circular in shape, and one or more spinner fins 110 that are radially located and are projecting from the spinner dish substantially vertically and configured to push the dry product. These spinner assemblies 108 receive the dry product material from the material flow divider 106 and broadcast it rearwardly and outwardly from the dry product spreader 100. The rotational speed of the spinner assemblies 108 can be adjusted, and in doing so, the distance that the material is spread may be changed. The configuration, number, and shape of the fins 110 located on each spinner dish 109 may be selected so as to create an even distribution of material across the full spreading width.

The current configuration of the dry product spreader 100 evenly drops dry product material the full width of the conveyor belt 104 onto the material flow divider 106, which then evenly drops the material onto the spinner assemblies 108 to allow for a uniform spread distribution. The material placement on the spinner assemblies 108 has an effect on the spread pattern such that the closer the material is placed to the centerline of the spinner dish the further away from the spreader that material is spread. To create a uniform spread pattern, the material being dispensed onto the spinner assemblies 108 has to be uniform across a designated width of the spinner dishes 109 and fins 110.

Since the location of the material being dropped toward the spinner assemblies 108 relative to the distance away from the centerline of the spinner dish determines the location of the material in the spread pattern, there is the ability to control the amount of dry product material spread in different zones by regulating the amount of product being dropped toward the spinner assemblies 108 in corresponding sections radially along the width of the spinner assemblies 108.

Embodiments add to the configuration of dry product spreader 100, e.g., by providing the ability for swath control by regulating the amount of dry product material dropping off the conveyor in designated sections and redistributing that said material across the rest of the sections, which in turn controls the placement of the material on the spinner assemblies in predefined sections. Embodiments utilize pneumatic conveyance to regulate the dry product in these designated sections, though other configurations also are possible. In embodiments, air nozzles are located on the front face of the material flow divider and are directed rearward towards the distribution manifold 404.

Figure 4:
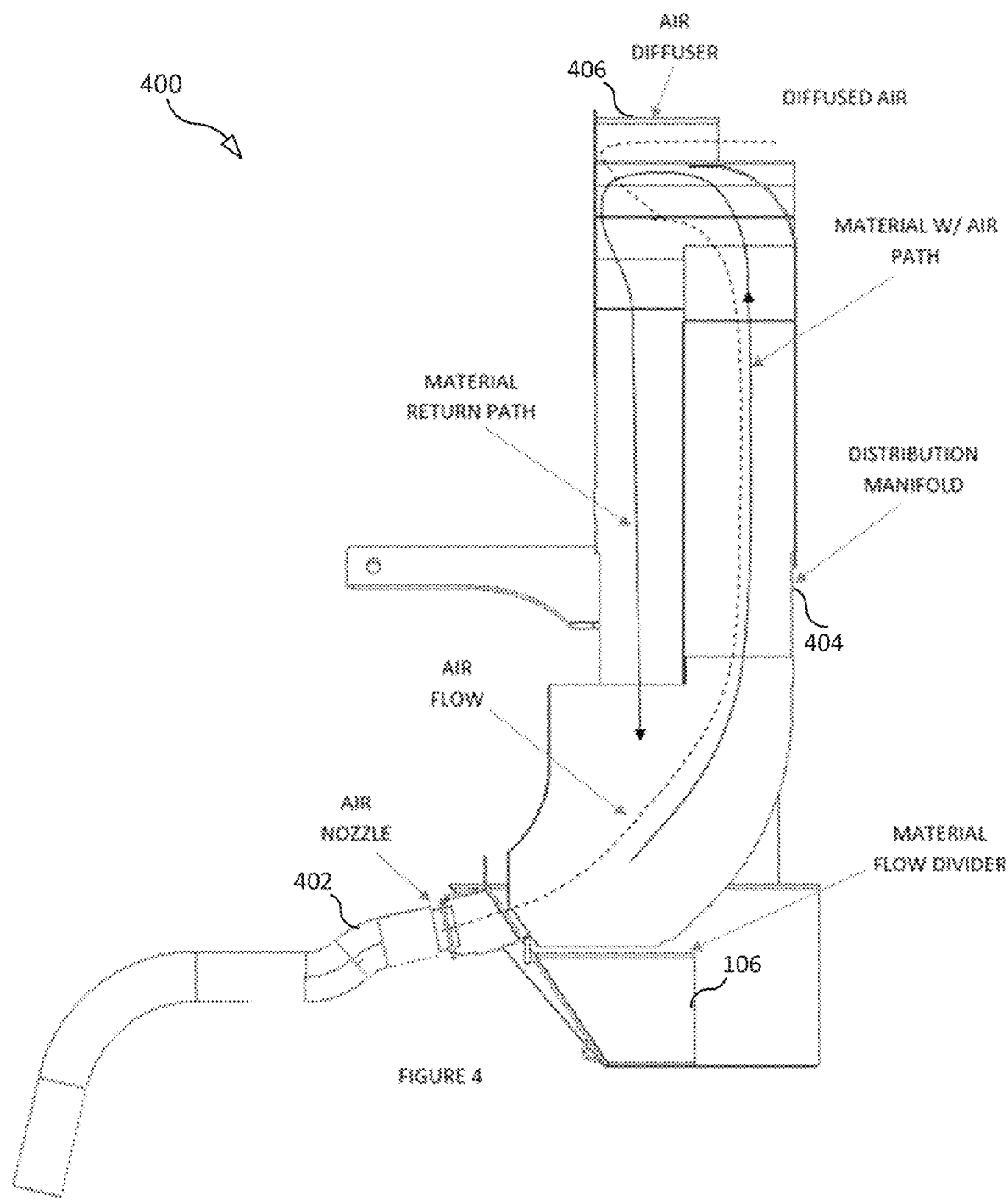
FIG. 4 illustrates a side view of a dry product flow controller, according to some embodiments.
Figure 5:
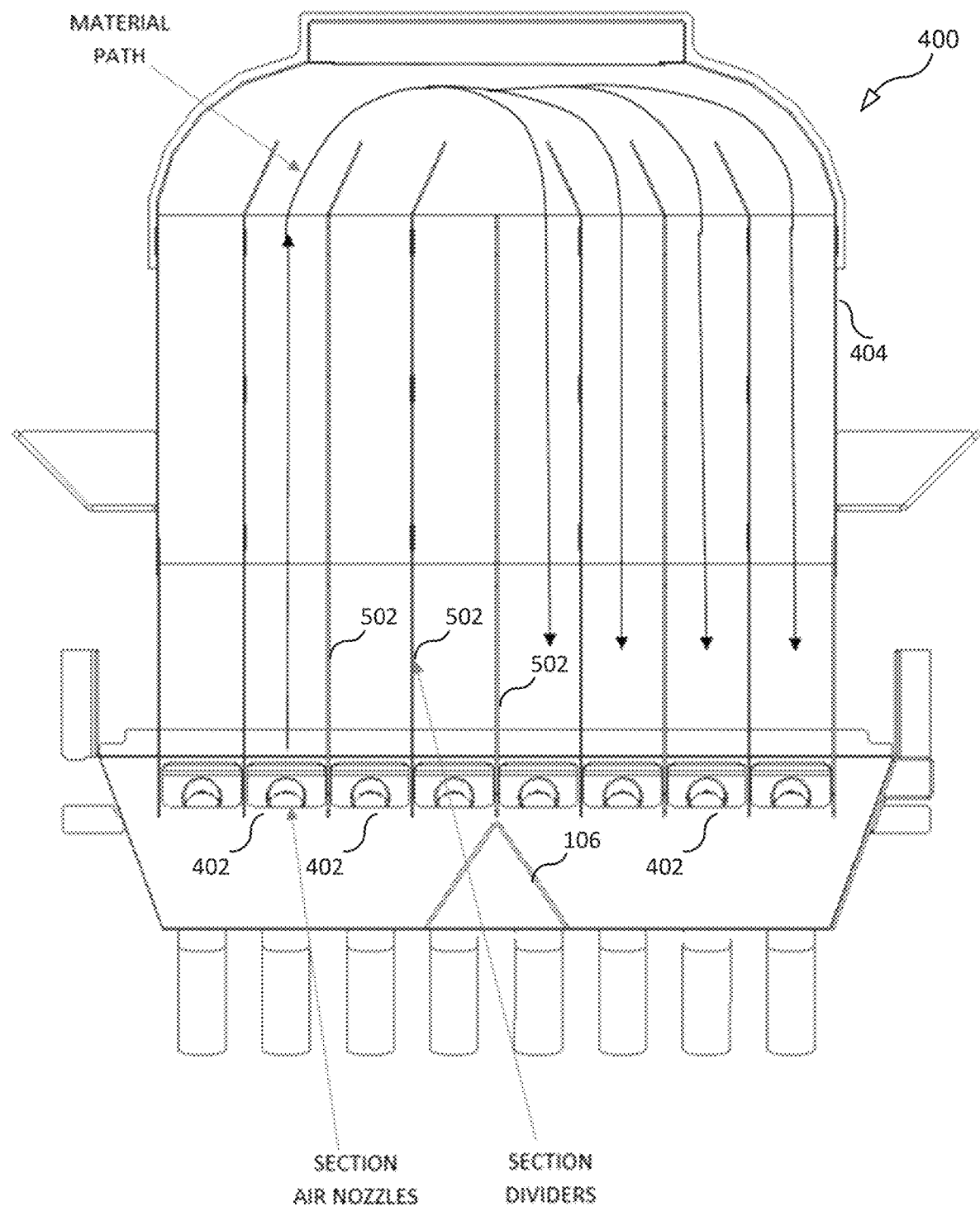
FIG. 5 illustrates a rear view of a dry product flow controller, according to some embodiments.
Figure 6:
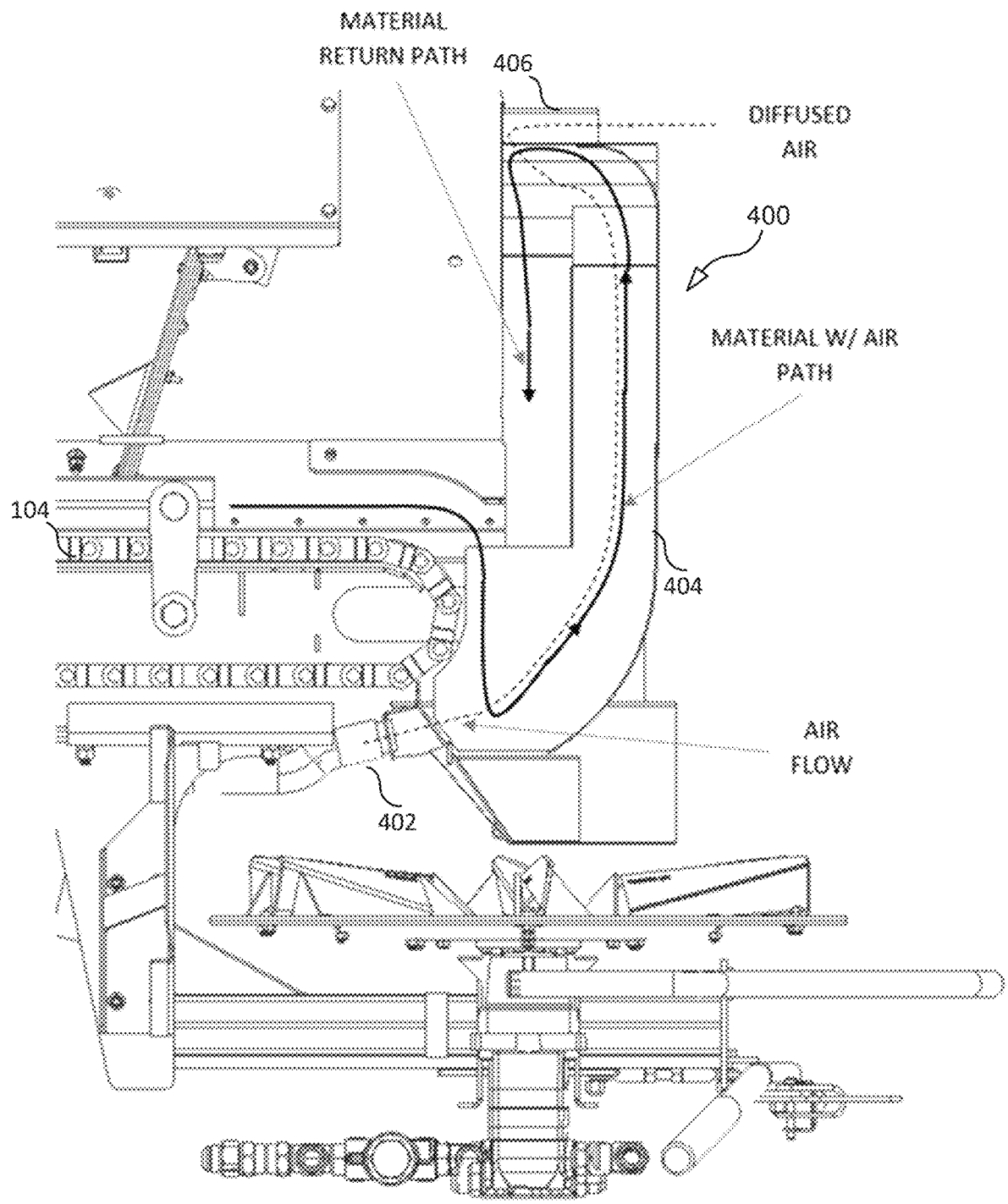
FIG. 6 illustrates a partial side view of a dry product spreader, showing some internal features, according to some embodiments.
Figure 7:
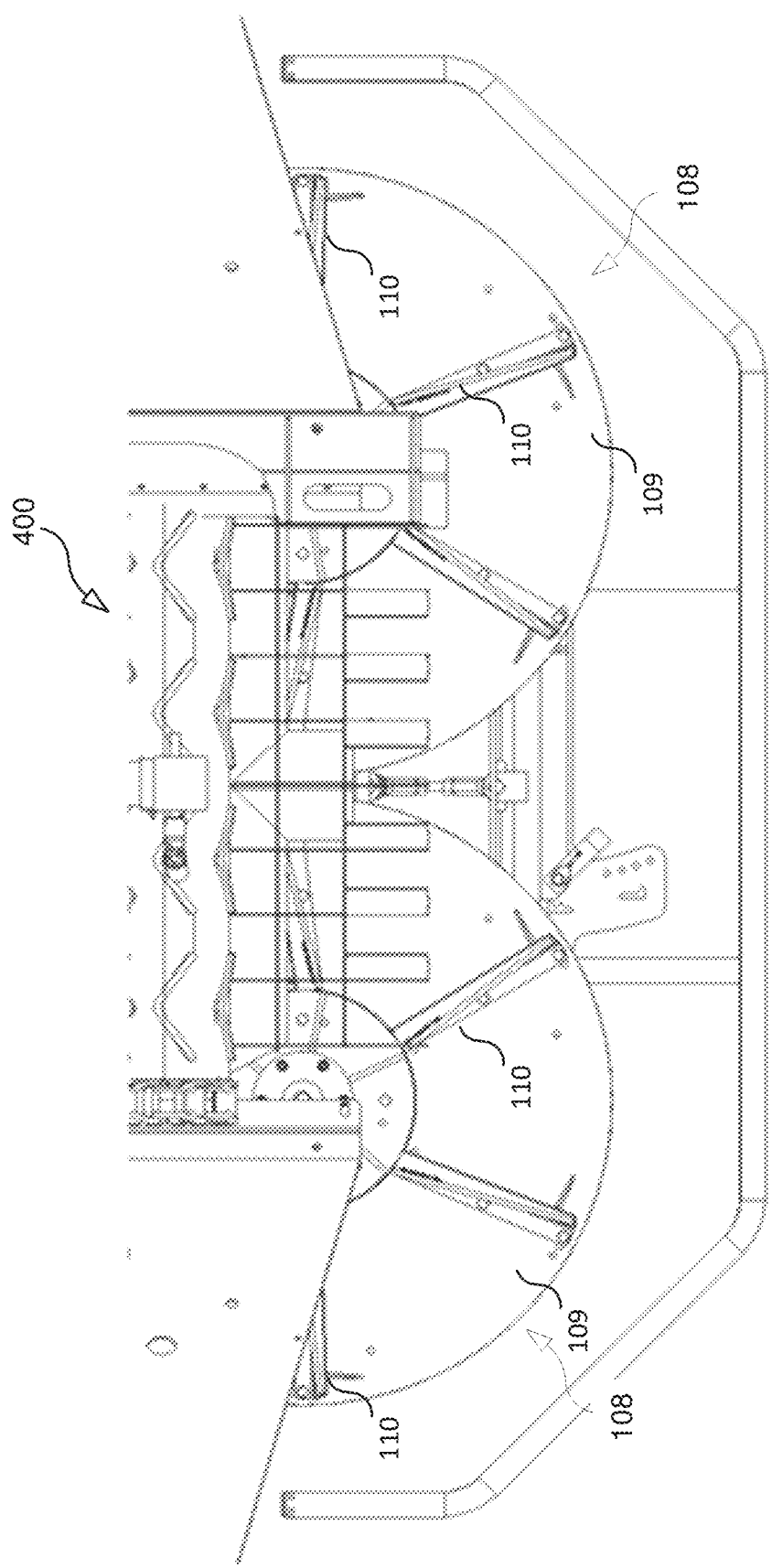
FIG. 7 illustrates a partial top view of a dry product spreader, according to some embodiments.
Figure 8:
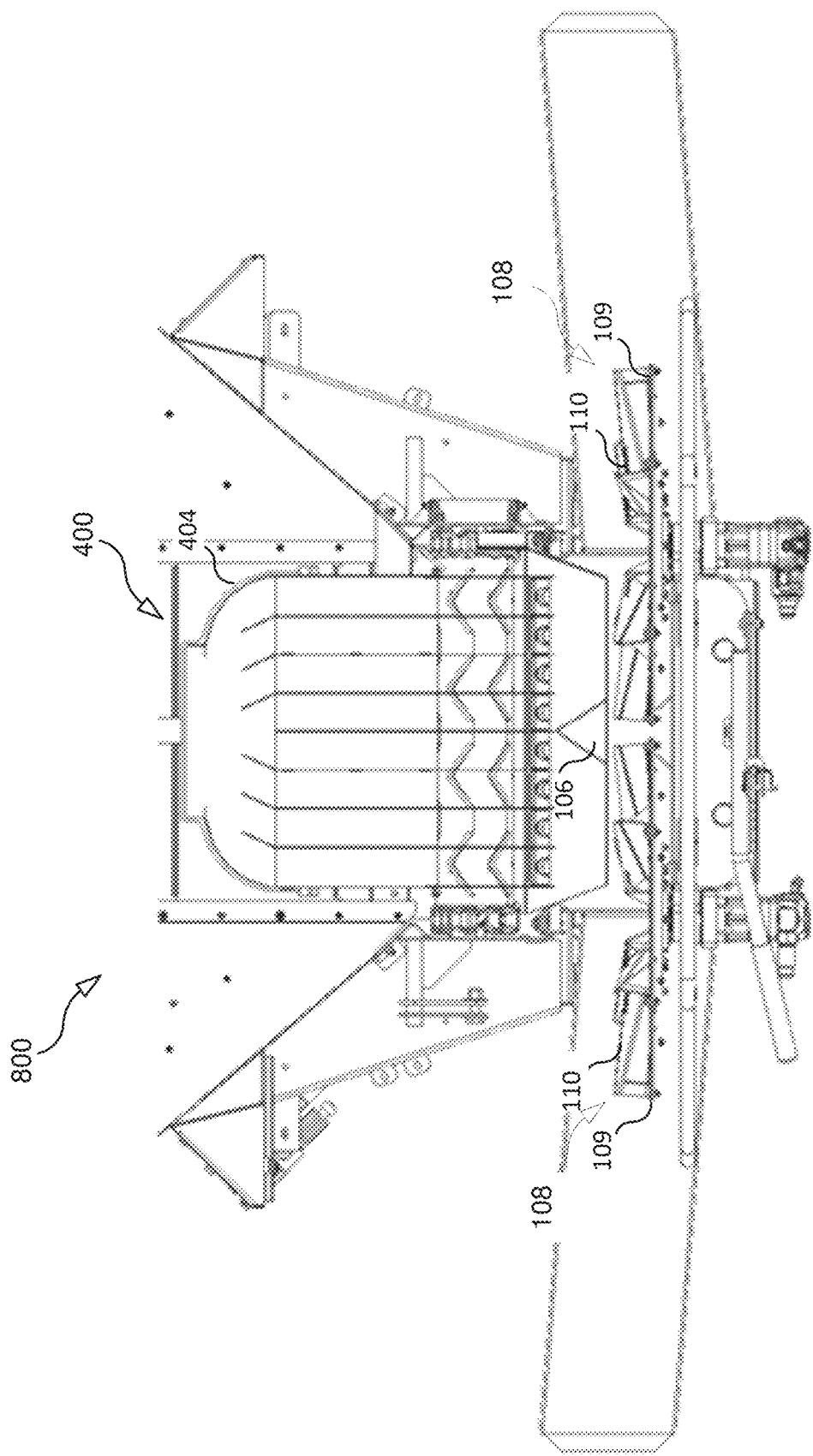
FIG. 8 illustrates a rear view of a dry product spreader, according to some embodiments.
Figure 9:
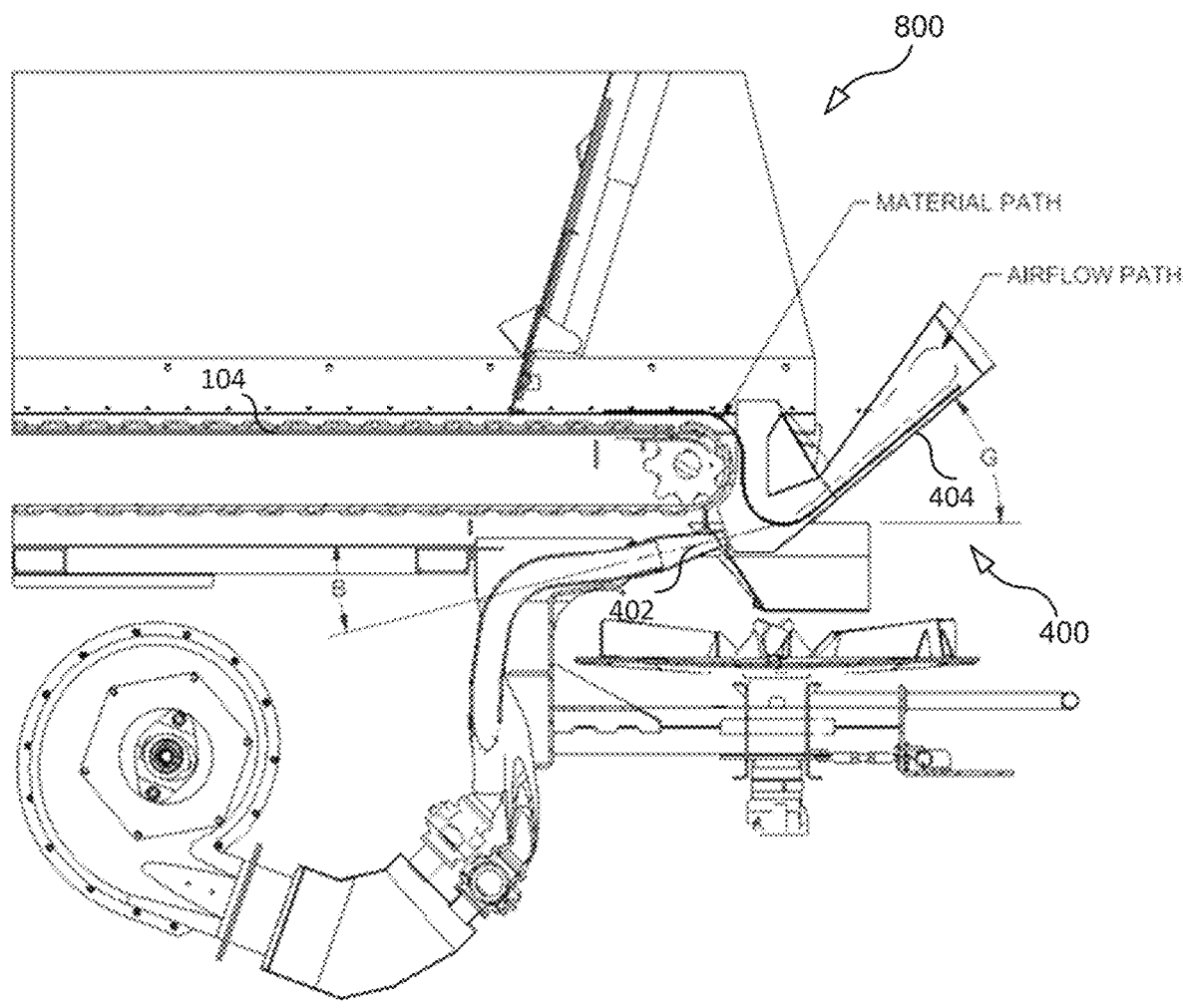
FIG. 9 illustrates a partial side view of a dry product spreader, showing some internal features, according to some embodiments.

FIG. 4 illustrates a side view of a dry product flow controller 400, according to some embodiments. FIG. 5 illustrates a rear view of a dry product flow controller 400, according to some embodiments. FIG. 6 illustrates a partial side view of a dry product spreader 800, showing some internal features, according to some embodiments. FIG. 7 illustrates a partial top view of a dry product spreader 800, according to some embodiments. FIG. 8 illustrates a front view of a dry product spreader 800, according to some embodiments. FIG. 9 illustrates a partial side view of a dry product spreader 800, showing some internal features, according to some embodiments.

With respect to FIGS. 4-9, dry product flow controller 400 may be used to regulate the amount of dry product material dropping off the conveyor in designated sections and redistributing that said material across the rest of the sections. Flow controller 400 may be employed in a dry product spreader, such as dry product spreader 100. An exemplary dry product spreader 800 employing flow controller 400 is shown in FIG. 8. As shown, flow controller 400 includes one or more air nozzles 402, a distribution manifold 404, and an air diffuser 406. The one or more air nozzles 402 are situated approximately toward a bottom of the manifold 404, and are capable of causing a primarily or substantially upward air flow toward the air diffuser 406 that is situated approximately toward a top of the manifold 404. As shown, the air flow is capable of diverting a portion of the dry product material through the distribution manifold 404. In embodiments, air nozzles 402 may be an air knife, or behave similar to an air knife, such as is used in industrial applications for cleaning, drying, and conveying. Each of the one or more air nozzles 402 may have section dividers 502 associated with it (as shown in FIG. 5), which divide the interior space of the manifold 404. The dividers 502 extend from the respective air nozzles 402, or approximately therefrom, toward a top of the manifold 404. The dividers 502 may not, in embodiments, reach all the way to the top of manifold 404, but rather, may have a gap so as to allow material to be diverted from one section to another via the air nozzles 402. An exemplary material path is shown in FIGS. 4-6. The dividers 502 may be substantially vertical, and may also include a slanted portion, e.g. as shown in FIG. 5 where a top portion of the dividers 502 is slanted inward toward the centerline of the flow controller 400.

As the flow controller 400 displaces dry product material by conveying dry product material in a different direction than it otherwise would go (e.g., pneumatically by the one or more air nozzles 402), it may also be referred to as a material conveyance system. Displacing dry product material does not mean that all such material is necessarily displaced, and may include a fraction of the material being conveyed by conveyor belt 104 toward the spinners. In embodiments, the amount of material being displaced in a given section may be about 95%, though other values smaller or greater than this are also within the scope of disclosed embodiments. Thus, the invention includes embodiments wherein a portion of the dry product material is extracted from the dry material stream being conveyed toward the spinners, and redirected or displaced by controller 400.

The one or more air nozzles 402 may be angled in a particular way to help redirect the dry product material into the distribution manifold 404. For example, as shown in FIG. 9, the one or more air nozzles 402 may each be angled upwardly (or a subset of the one or more air nozzles 402 may be angled upwardly) relative to a horizontal plane at an angle B of 10° to 20°. The angle B may be the same or different for each of the air nozzles 402. The angle B is illustrated in FIG. 9. In embodiments, the distribution manifold 404 may be positioned substantially vertically. In other embodiments, the distribution manifold 404 may be angled, such as shown in FIG. 9, at an inclined angle G of at least 30° relative to the horizontal axis, to help prevent the return material from building up within the material manifold 404.

In embodiments, the air nozzles 402 may comprise a fan, e.g., similar to that used in other pneumatic conveying agricultural equipment systems such as air seeders and granular strip till toolbars. The propulsion system for this fan may be a standalone hydraulic or electronic motor.

Figure 10:
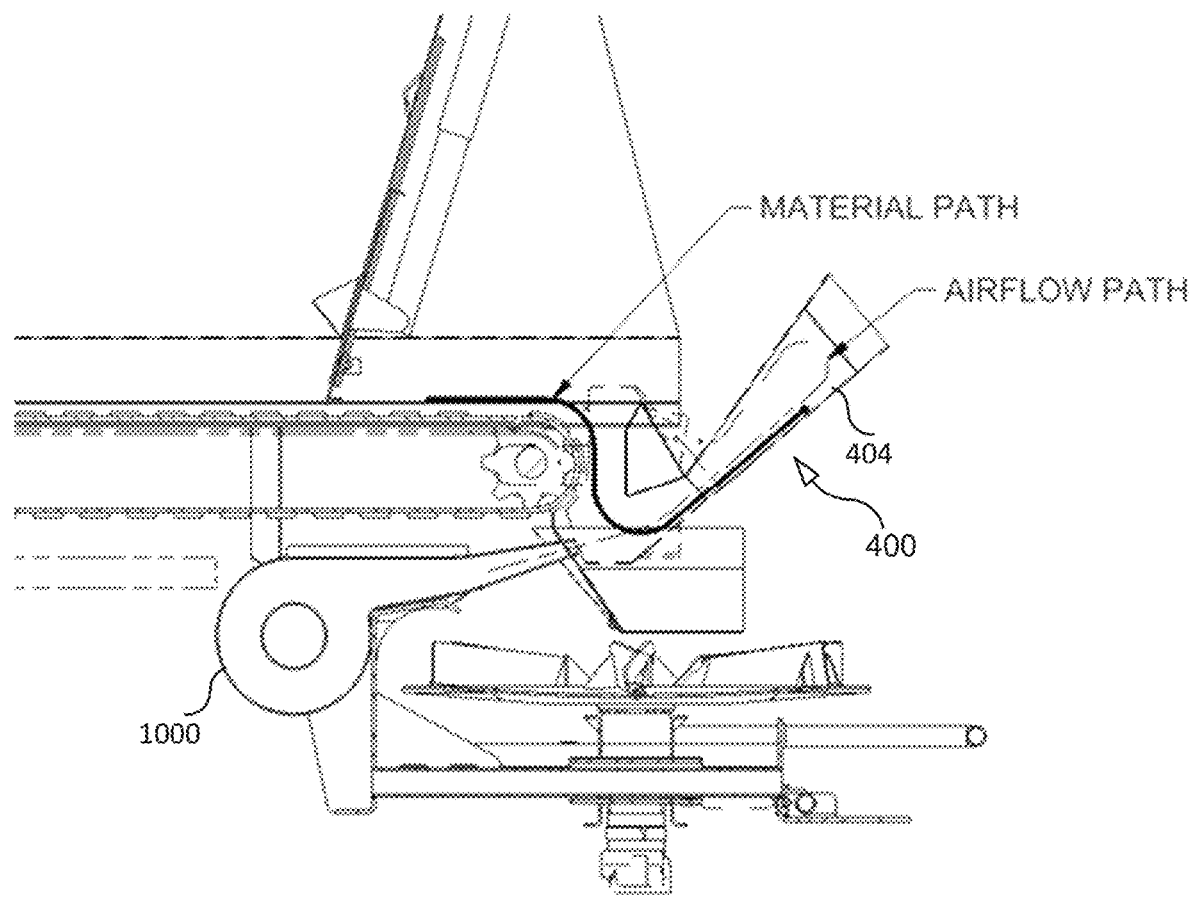
FIG. 10 illustrates a wide frame centrifugal fan also known as a squirrel cage fan arrangement, according to some embodiments.

FIG. 10 illustrates a wide frame centrifugal fan also known as a squirrel cage fan arrangement 1000, according to some embodiments. The air nozzles 402 may comprise a squirrel cage fan 1000 for propelling air.

Figure 11:
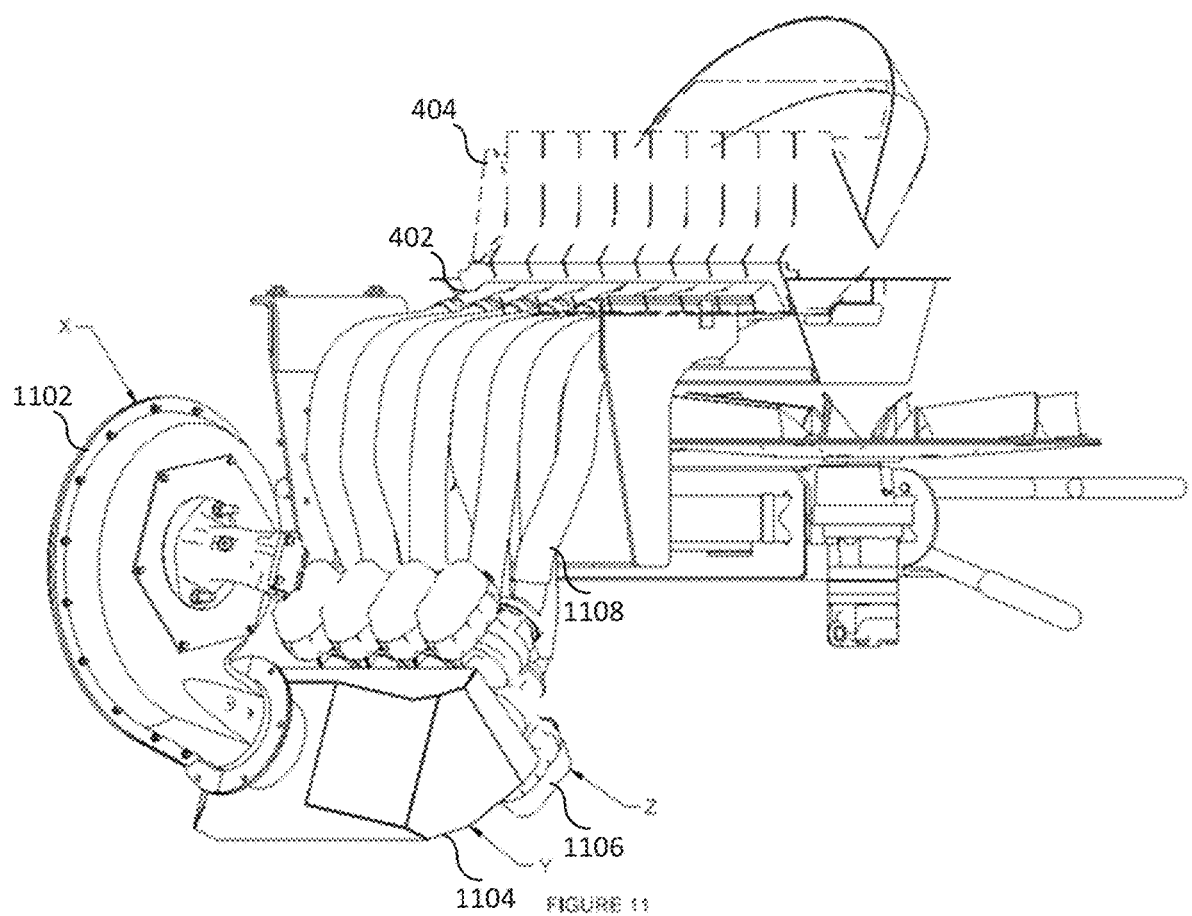
FIG. 11 illustrates another centrifugal fan arrangement, according to some embodiments.

FIG. 11 illustrates another centrifugal fan arrangement, according to some embodiments. A single centrifugal fan 1102 (also labeled X) may be propelled by a hydraulic motor or other type of fan propulsion and may also be attached to an air distribution box 1104 (also labeled Y) to divert the airflow to nozzle supply lines 1108, that are in turn connected to each of the air nozzles 402. For example, the air distribution box 1104 may divert airflow equally to each of the nozzle supply lines 1108. As shown, the embodiment utilizes eight individual nozzle bodies, but alternate embodiments could include fewer nozzle bodies or more nozzle bodies, e.g., as few as two nozzles and up to eight or more individual nozzles. The airflow for each air nozzle 402 may be controlled using a common ball valve 1106 (also labeled Z). Alternate valve types that may be used include butterfly valves, knife valves, or other common airflow control valves.

Figure 12:
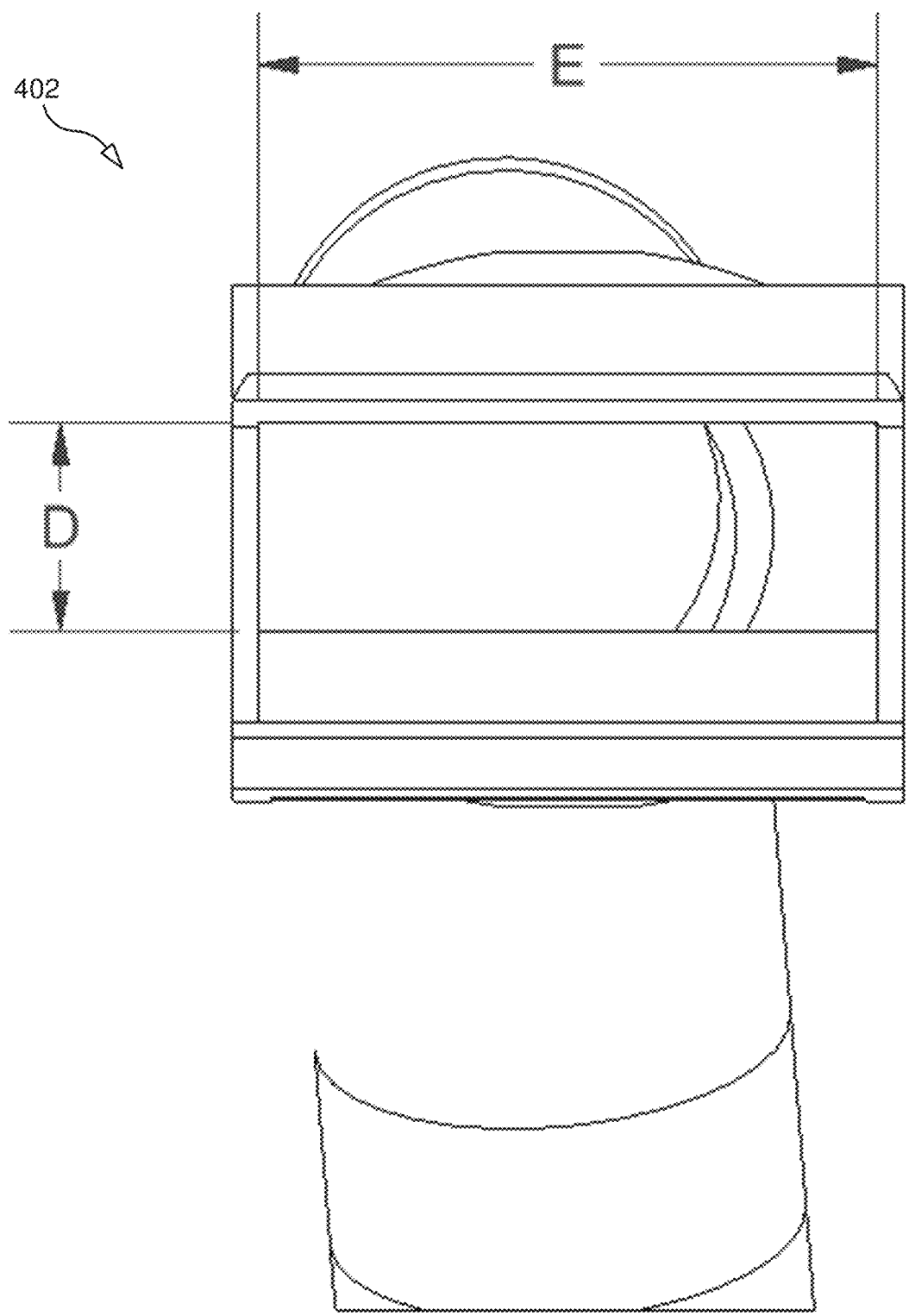
FIGS. 12-13 illustrate a nozzle, according to some embodiments.
Figure 13:
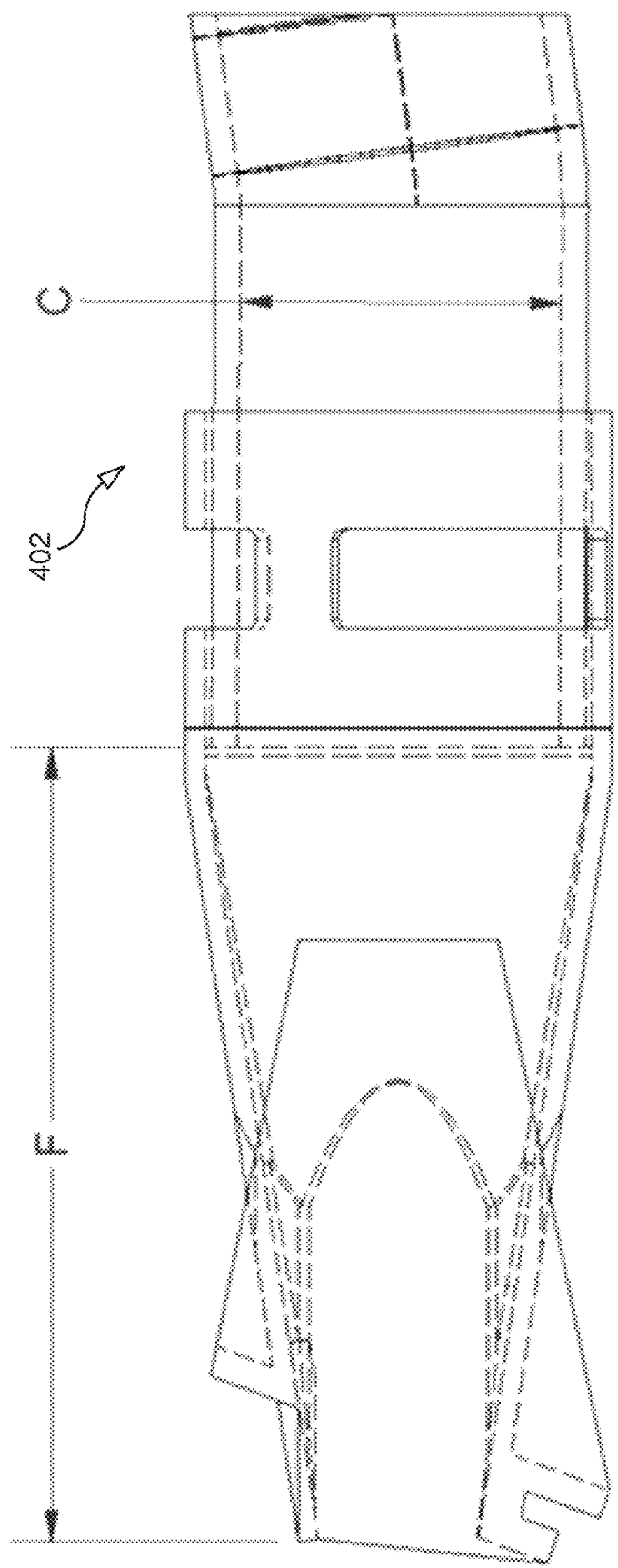

FIGS. 12-13 illustrate a nozzle 402, according to some embodiments. As shown, the nozzle configuration utilizes a round tube, with an inner diameter C (FIG. 13), which may be about 2 inches in an embodiment, as the supply line from the fan; and transitions to a rectangular outlet, with vertical dimension D (FIG. 12), which may be about 1 inch in an embodiment, and horizontal dimension E (FIG. 12), which may be about 3⅛ inch in an embodiment, for each given section. The length of nozzle transition F (FIG. 13), may be about 2½" times the diameter of the supply line in an embodiment, to allow for a uniform outlet airflow. Typical flowrates for a system with 8 sections are 150 to 200 cubic feet per minute per section nozzle, to achieve at least 90% reduction in material being dispensed toward the spinner assemblies in a given regulated section.

An alternate embodiment of the fan and air nozzles 402 shown in FIG. 10 may utilize a fan housing that is the full width of the conveyor belt 104 with a motor for each half of the width to create two sections. Utilizing a full width fan allows for a transition from the fan to the end of each nozzle 402 to be shorter due to the fan outlet shape being rectangular instead of a round shape commonly used on other fan configurations. With the utilization of a motor for each section, this embodiment does not require airflow control valves and therefore utilizes a smaller envelope on the broadcast spreader.

The distribution manifold 404 may include vertical dividers 502 between each air nozzle 402 to create a divided section for each air nozzle 402. When the air nozzle 402 is activated for a given section, the material that is dropping off of the belt 104 in that given section is redirected into the distribution manifold 404 prior to reaching the material flow divider 106. The redirected material is received into the bottom of the distribution manifold 404 and is directed upward. Once the material reaches the top of the distribution manifold 404, the material is deflected laterally relative to the unit. In addition to the side movement of the material at the top of the manifold, this configuration directs the material forward to an open area to allow for a uniform dispersal (such as shown in FIG. 4). This material is then dispersed within the distribution manifold 404 across the sections that are not being controlled (i.e. where the air nozzle 402 is not activated). An alternate configuration (such as shown in FIG. 5), can be such that once the material reaches the top of the distribution manifold 404, the material is deflected laterally relative to the unit and returned down the opposite divisions of the manifold 404 without being directed forward.

In some embodiments, as material travels upward in the distribution manifold 404, the material is deflected laterally relative to the unit by the angled side plates as well as the airflow from proximate regulated sections, i.e. by adjacent or nearby air nozzles 402. In addition to the side movement of the material, the upper face of the distribution manifold 404 may be angled upward relative to the lower face to allow for air expansion as the material travels upward. The expansion of the air allows for separation of the material from the airflow and allows the material to return down to the non-regulated sections. This material is then dispersed within the distribution manifold 404 across the sections that are not being controlled. The upper face of the distribution manifold 404 can also include an opening to diffuse the airflow towards the top of the distribution manifold to limit the effect of the airflow on the returning material.

Figure 14:
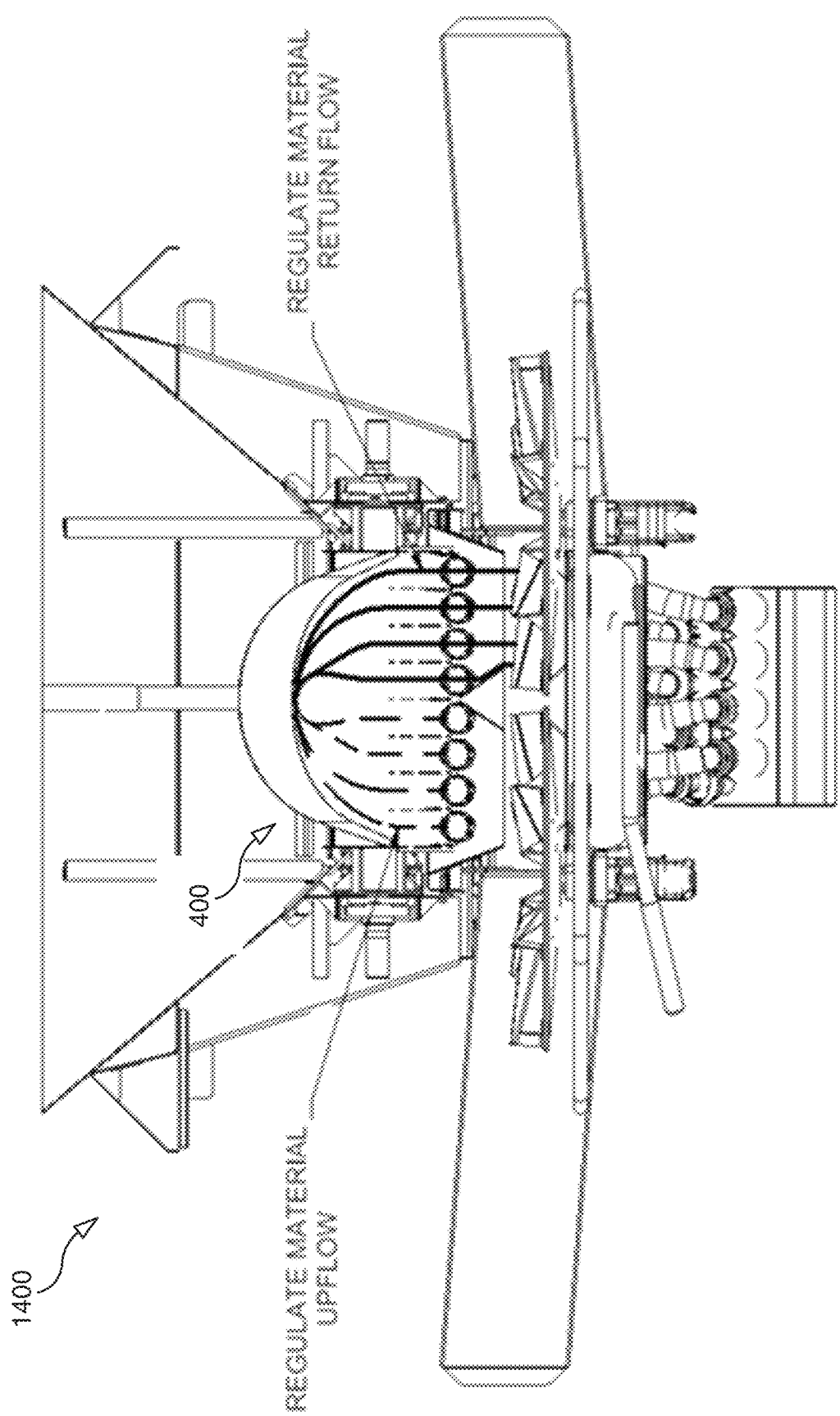
FIG. 14 illustrates a rear view of a dry product spreader, according to some embodiments.
Figure 15:
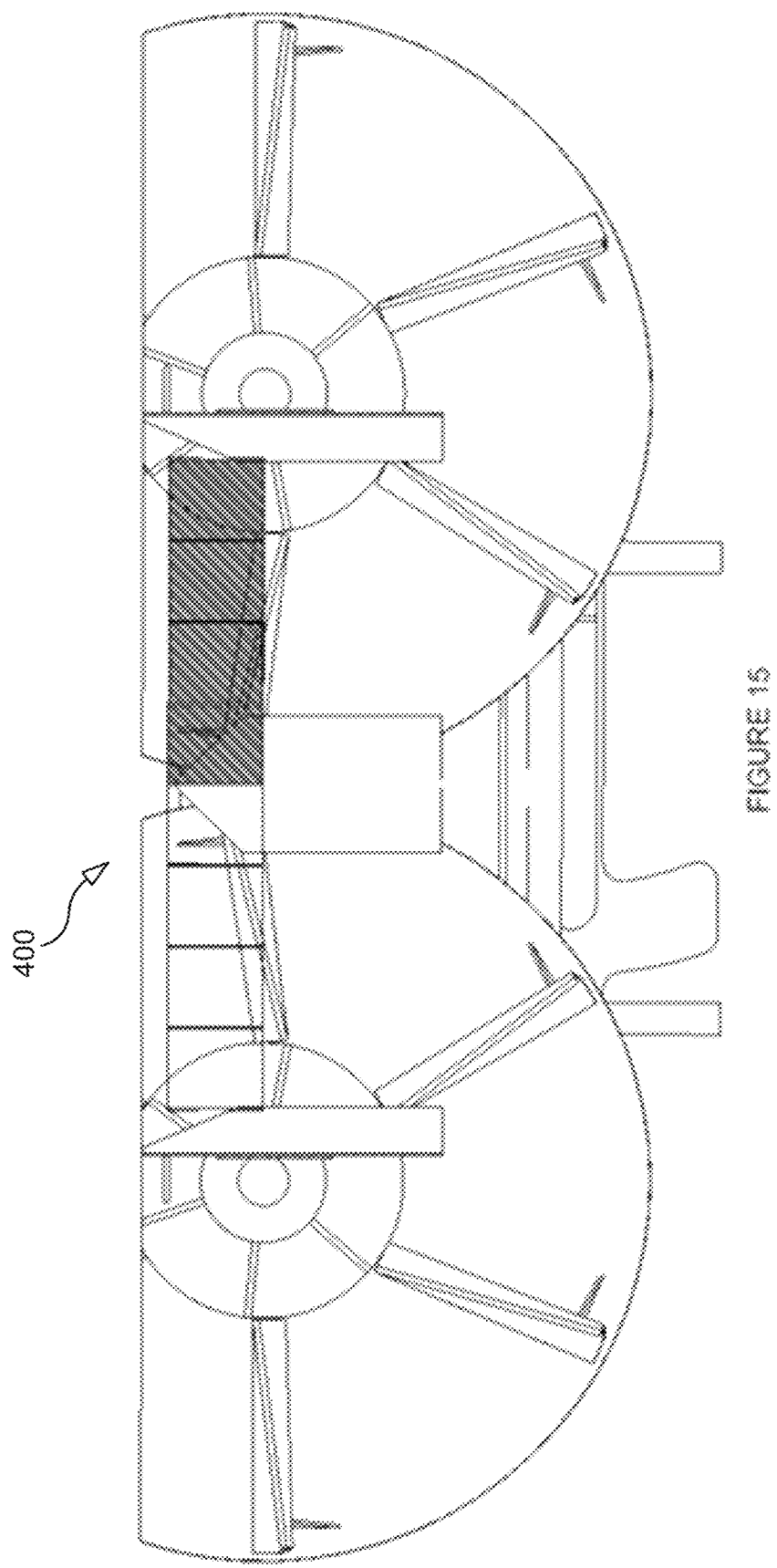
FIGS. 15-18 illustrate a partial top view of a dry product spreader, according to some embodiments.
Figure 16:
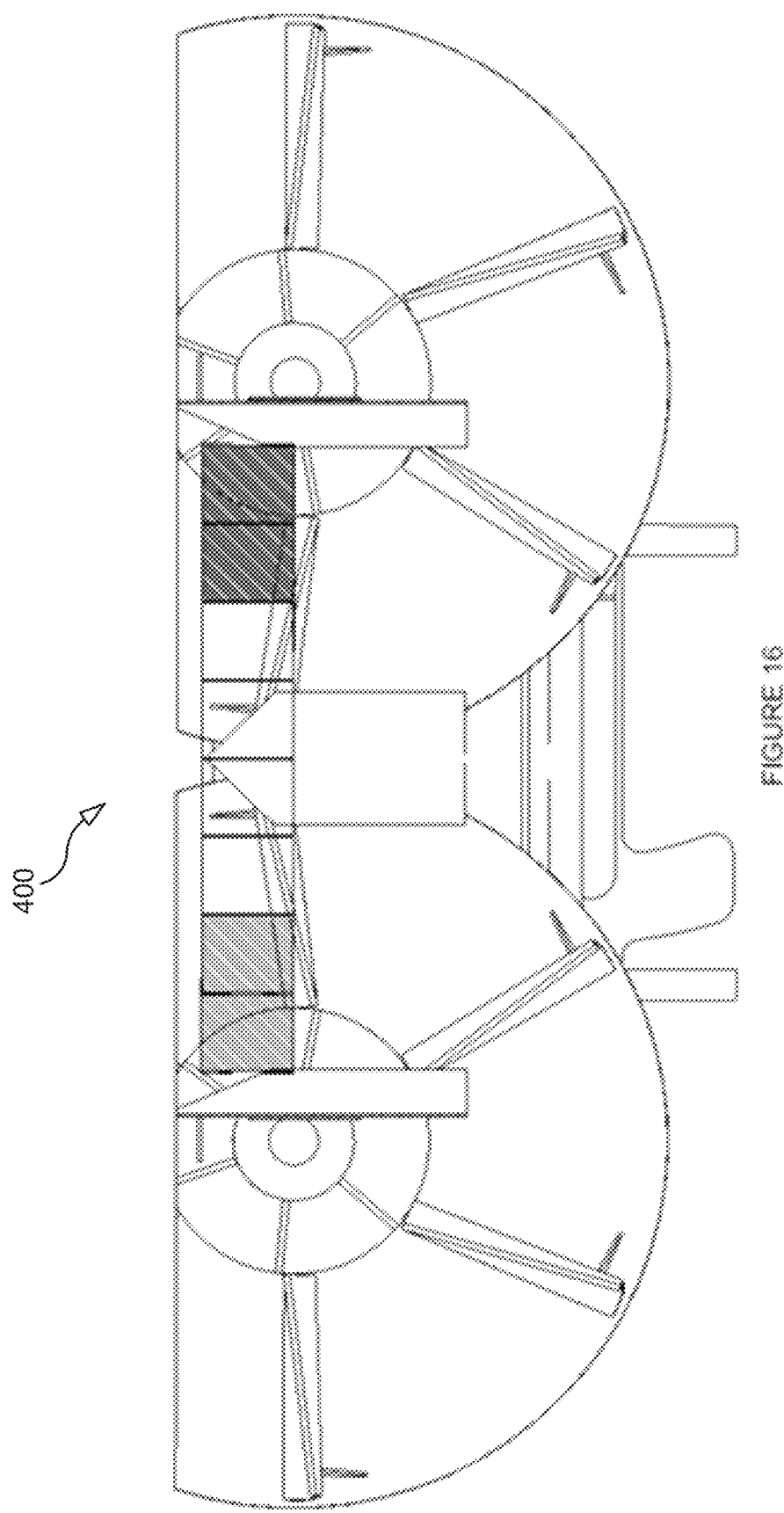
Figure 17:
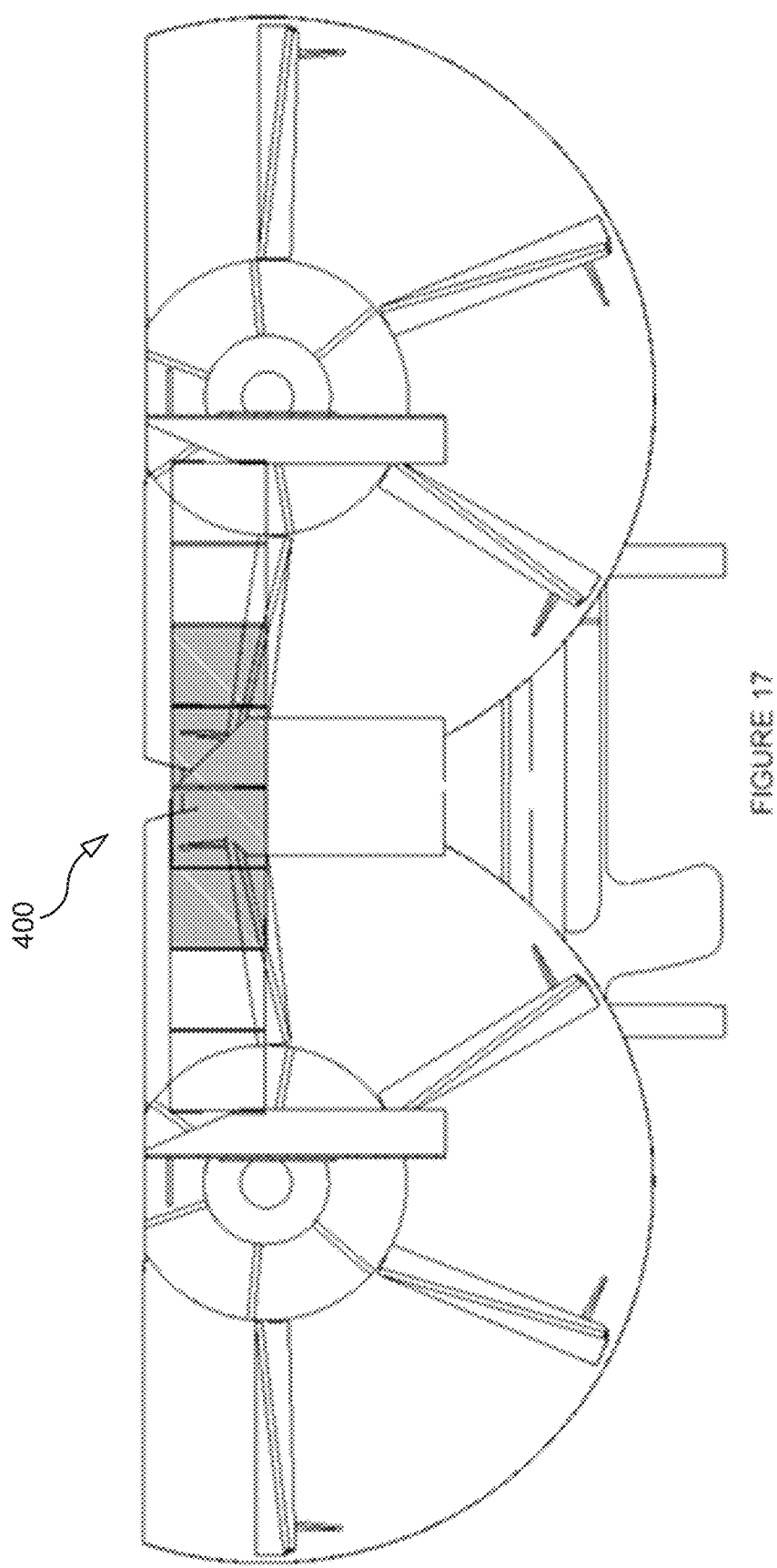
Figure 18:
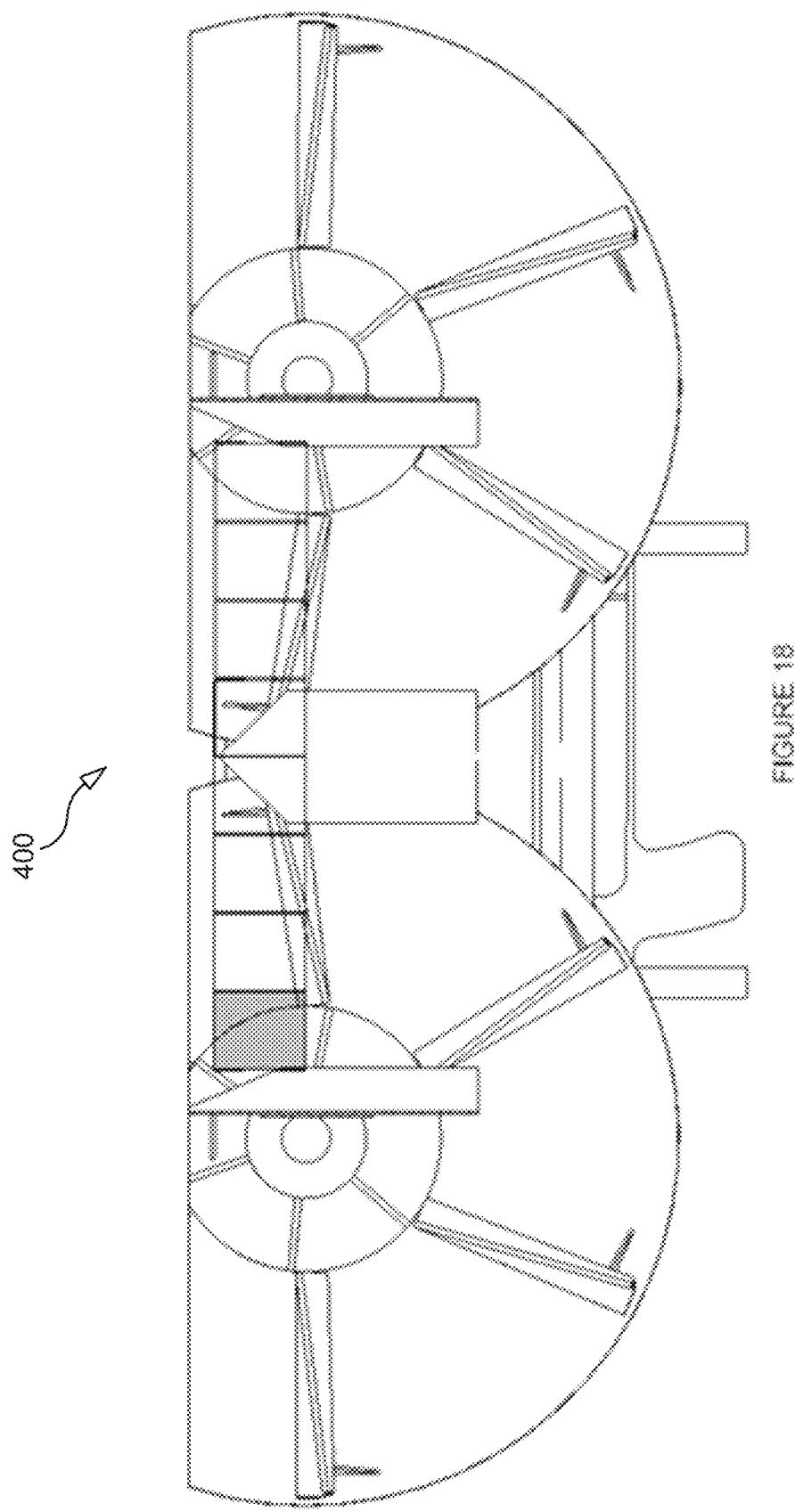
Figure 19:
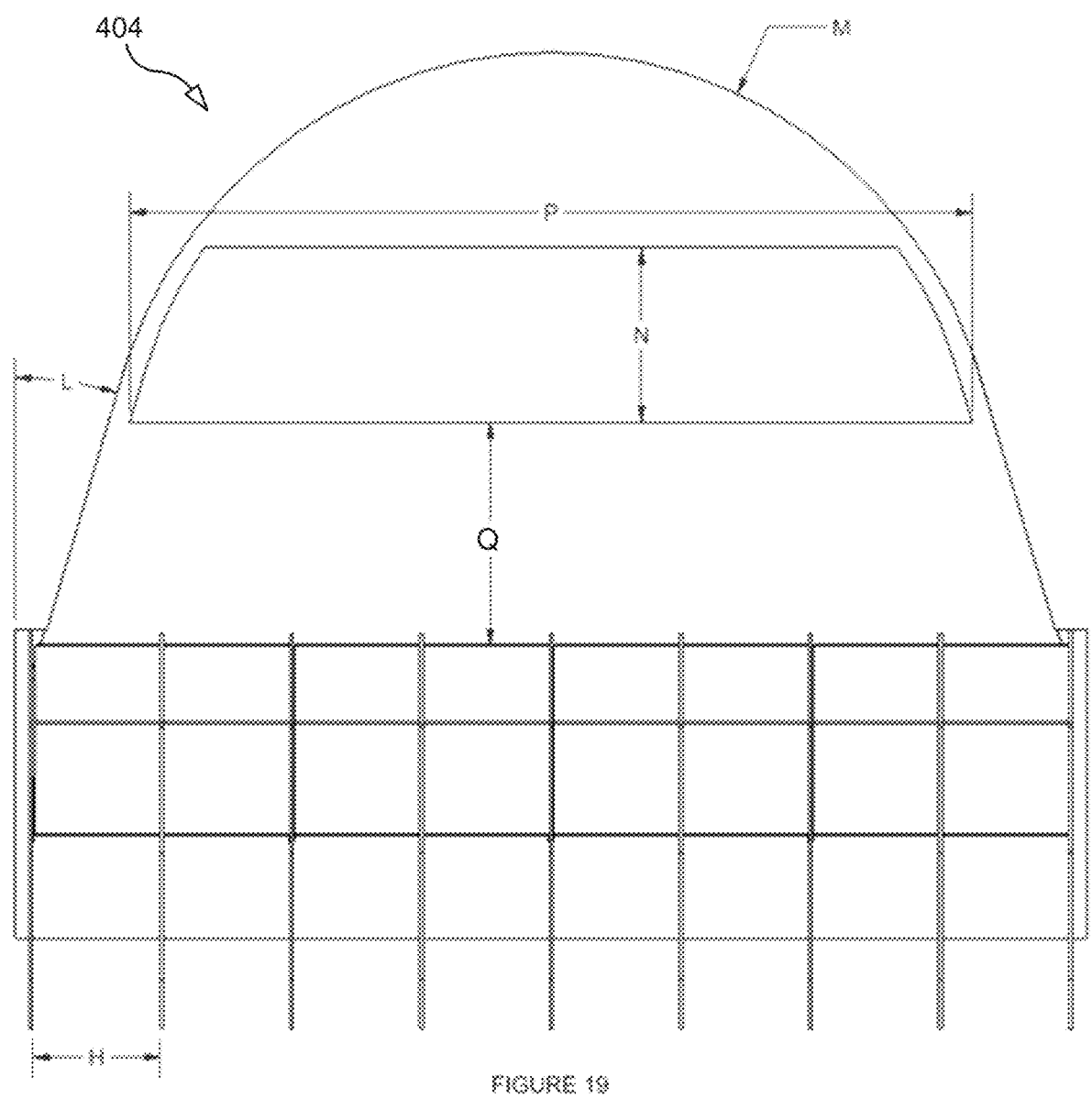
FIG. 19 illustrates a top view of the distribution manifold, according to some embodiments.
Figure 20:
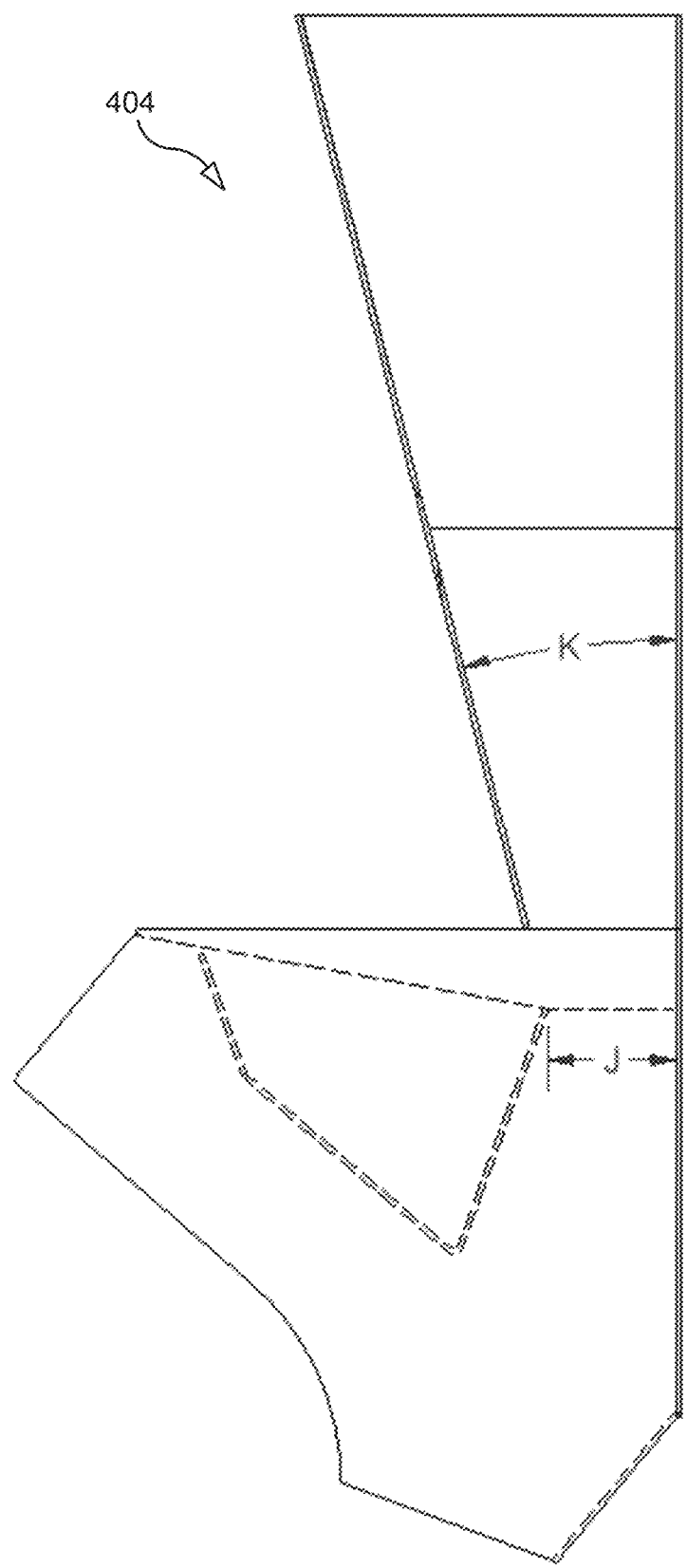
FIG. 20 illustrates a side view of the distribution manifold, according to some embodiments.
Figure 21:
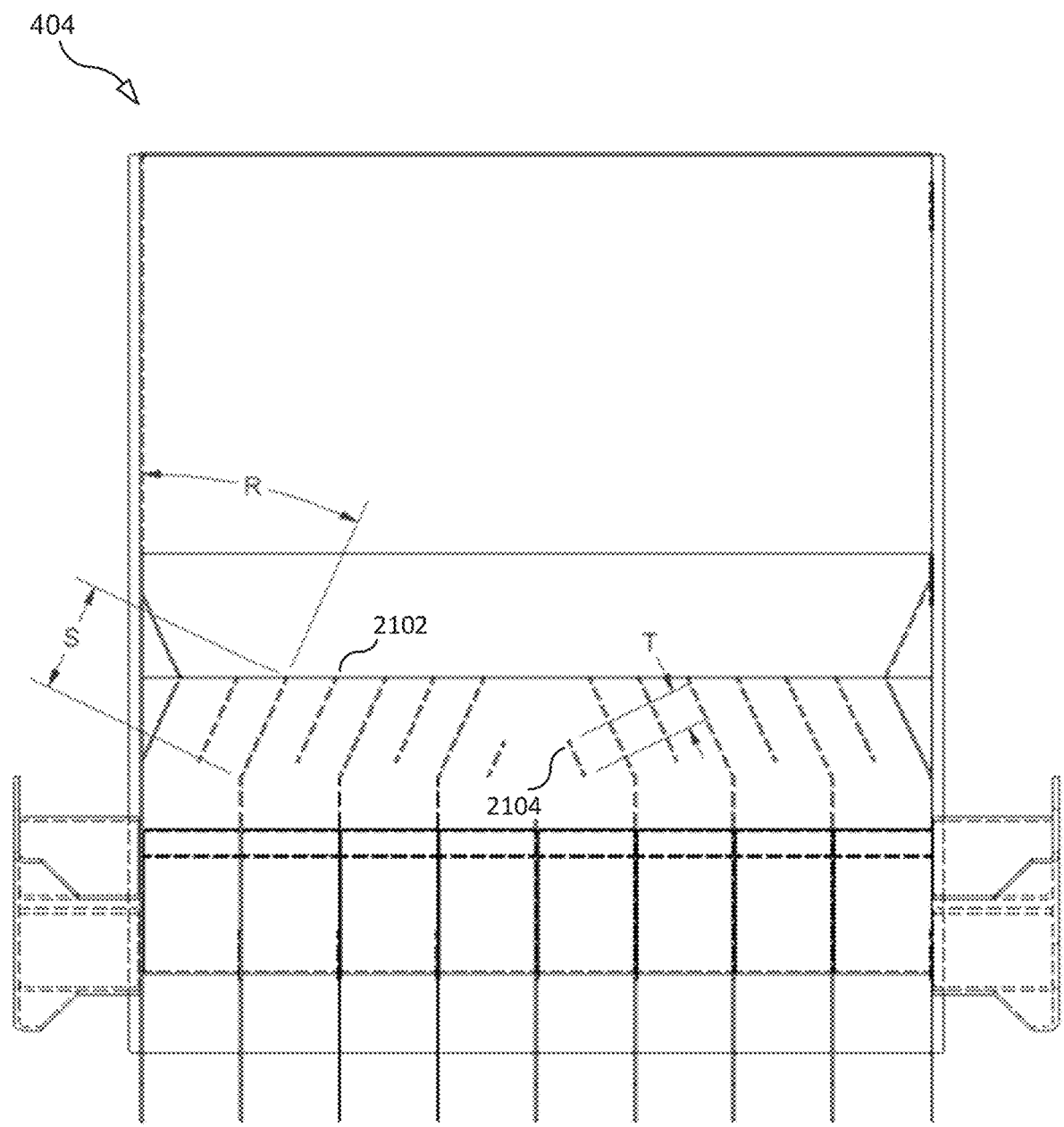
FIG. 21 illustrates a top view of the distribution manifold, according to some embodiments.

FIG. 14 illustrates a rear view of a dry product spreader 1400, according to some embodiments. Dry product spreader 1400 is similar to the dry product spreader 800, and includes a flow controller 400. As shown, there are eight sections, and therefore eight nozzles 402 that are separated by dividers 502. In operation, for example, material from the four left-most sections may be redirected to the four right-most sections, resulting in material only applied to the ground on the right side of the unit and producing an application that is half of the normal spread width. The upward material flow is shown as dashed lines in FIG. 14, and the returning material is shown as solid lines.

FIGS. 15-18 illustrate a partial top view of a dry product spreader 1400, according to some embodiments. As shown in FIG. 15, the four right-most sections are being regulated, as indicated by the hatching, i.e. the nozzles 402 associated with those sections are blowing air. Regulated, as used herein, means that the fertilizer or other dry product material is displaced (e.g., by the nozzles 402) from a given section of the material manifold 404 to another section of the material manifold 404. As shown in FIG. 16, the two left-most and two right-most sections are being regulated, as indicated by the hatching. As shown in FIG. 17, the four middle sections are being regulated, as indicated by the hatching. As shown in FIG. 18, the left-most section is being regulated, as indicated by the hatching. These, and other combinations, are possible, which allow for different patterns of re-distributing the material. In general, any subset of the nozzles 402 may be regulated during operation for a given period of time.

FIG. 19 illustrates a top view of the distribution manifold 404, according to some embodiments. FIG. 20 illustrates a side view of the distribution manifold 404, according to some embodiments. With respect to FIGS. 19-20, the distribution manifold 404 may include multiple sections (eight are shown), where each section has a width H (such as about 3⅛ inch wide) and a height J (such as from about 1½ inch to about 2½ inches). The distribution manifold 404 may include angled side plates in the upper portion of the manifold 404, positioned at an angle L (such as about 14° to 45°) and an upper radius M (such as from about 6 inches to about 12 inches). The upper plate of the distribution manifold 404 may be positioned at an angle K (such as about 10° to 20° relative to the lower plate) to allow for expansion of the airflow on each given regulated section. The upper plate may also include a diffuser opening located at a distance Q (such as from about 6 inches to about 10 inches) up from the bottom edge of the upper face with a vertical opening N (of about 2 inches to about 6 inches) and a horizontal opening P (of about 12 inches to about 25 inches).

FIG. 21 illustrates a top view of the distribution manifold 404, according to some embodiments. The distribution manifold 404 may include angled diverters (such as diverters 2102 and 2104). The angled diverters may be positioned at an angle R (e.g., about 15° to about 35°, relative to the vertical divider plate) with a length S (e.g., about 2 inches to about 3 inches). The angled diverters on the center two sections (one of which is labeled as 2104) may be shorter in length, having a length T (e.g., about 1 inch), due to the proximity of each center angled diverter. The angled diverters are positioned at a fixed angle to deflect the regulated material to a designated location relative to the unregulated sections. An alternate embodiment may include rotatable angled diverters that are capable of changing the angle for each regulated section to deflect the regulated material in different locations within the distribution manifold 404. These angled diverters may cover the entire height of each cross section, or may be shorter in height relative to the overall section height. The upper face of each section is positioned to end at the top of each angled diverting plate to allow for the airflow in the regulated sections to release from the regulated material.

This distribution manifold 404 may include a diffuser area located above the top face of the manifold to allow for the airflow from each regulated section to diffuse once the material is above the regulated section channels. The airflow is being diffused so that the airflow doesn't affect the material as it is being dropped back down into the material flow divider. This air diffusor can have a fixed opening or have the capability to have an adjustable opening to accommodate changes to the air nozzle flowrate due to changes in material properties.

The distribution manifold 404 may also include features such as protrusions, extrusions, dimples, baffles, and so on, to aid in creating a uniform distribution of the regulated material.

In embodiments, since this swath control system does not change the width of the material on the conveyor belt when given sections are regulated, the conveyor belt speed may be reduced to prevent over application of dry product material when sections are regulated by the swath control system.

Figure 22:
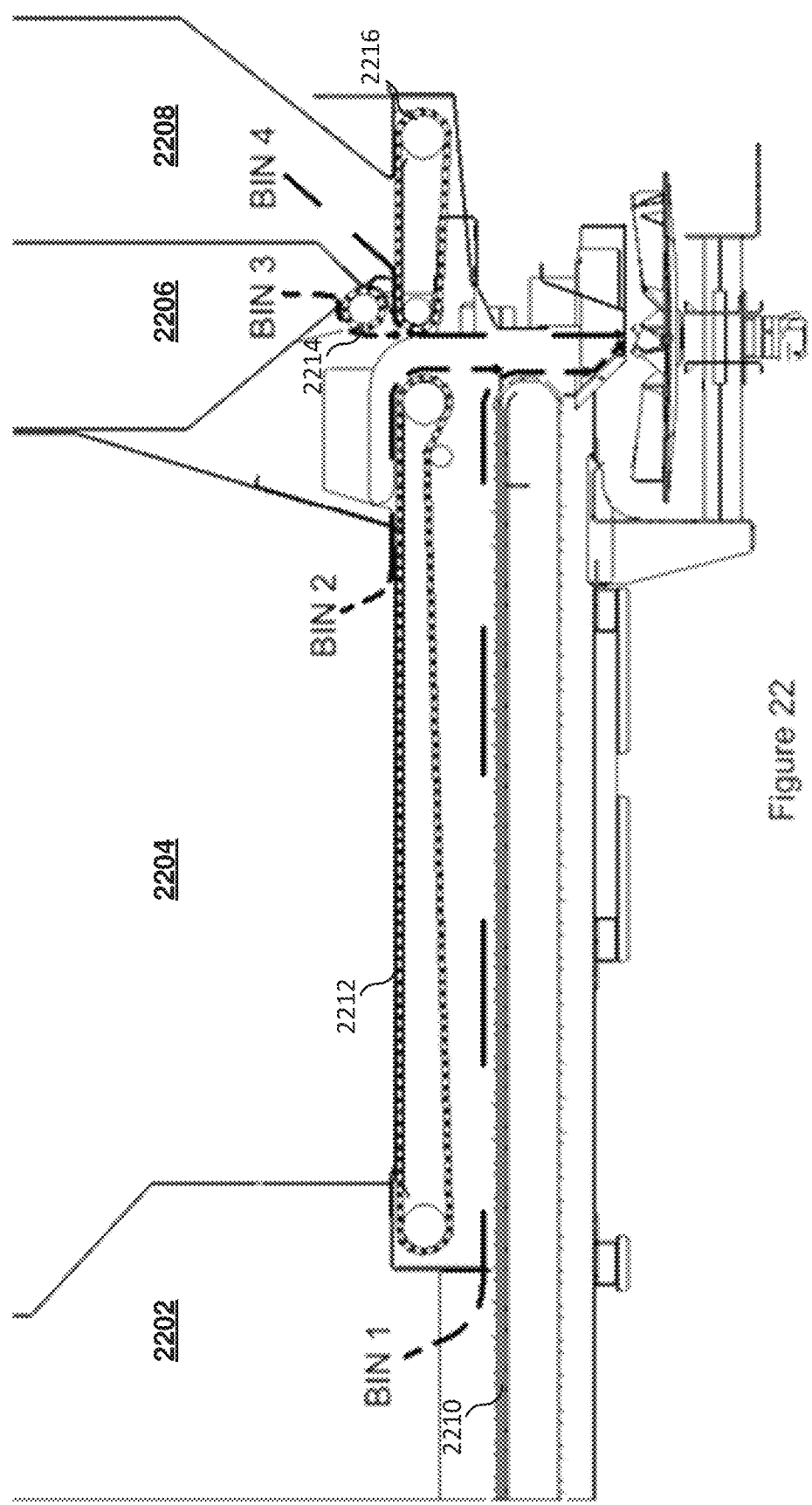
FIG. 22 illustrates a partial side view of a dry product spreader according to some embodiments.

FIG. 22 illustrates a partial side view of a dry product spreader according to some embodiments. As shown, the dry product spreader may include multiple bins, such as bins 2202 (also labeled bin 1), 2204 (bin 2), 2206 (bin 3), and 2208 (bin 4). Each of these bins is associated with a corresponding conveyor belt, respectively, conveyor belts 2210, 2212, 2214, and 2216. In embodiments, fewer bins or more bins may also be employed, and there may likewise also be fewer or more conveyor belts. In embodiments, the position of the drop point for each bin and conveyor belt is in a similar location over the material flow divider, such as shown in FIG. 22. This positioning of the drop point allows for the ability to adjust the application rate for each bin independently. This system is capable to be used on a single bin unit, or a unit with multiple bins, with minimal configuration changes.

While a pneumatic conveyance system has been described with respect to some of the preceding figures, it is also possible to implement a swath control system without relying on pneumatic conveyance, or with a combination of pneumatic and non-pneumatic conveyance. For example, a combination of mechanical components can be used to regulate the material in each section. This can be done by a combination of valves or adjustable mechanical dividers to divert the regulated material into a secondary hopper or an auger/conveyor system that moves the regulated material to the sections that are not being regulated. This swath control system could also comprise a combination of both pneumatic and mechanical components.

In conjunction to this swath control configuration, a controller can be utilized to provide the ability to control the swath control's air nozzles using valves or other means of flow control. This controller can also be used to adjust the conveyor belt speed to change the material flowrate when the swath control system is regulating any number of sections. Due to the differences in physical properties (e.g., density, shape, size) of the material being spread with this system, the controller can also be utilized to provide the ability to control the fan speed. This controller can also be used to control the air diffusor described in the main configuration or the airflow valve described in the alternative fan configuration.

Figure 23:
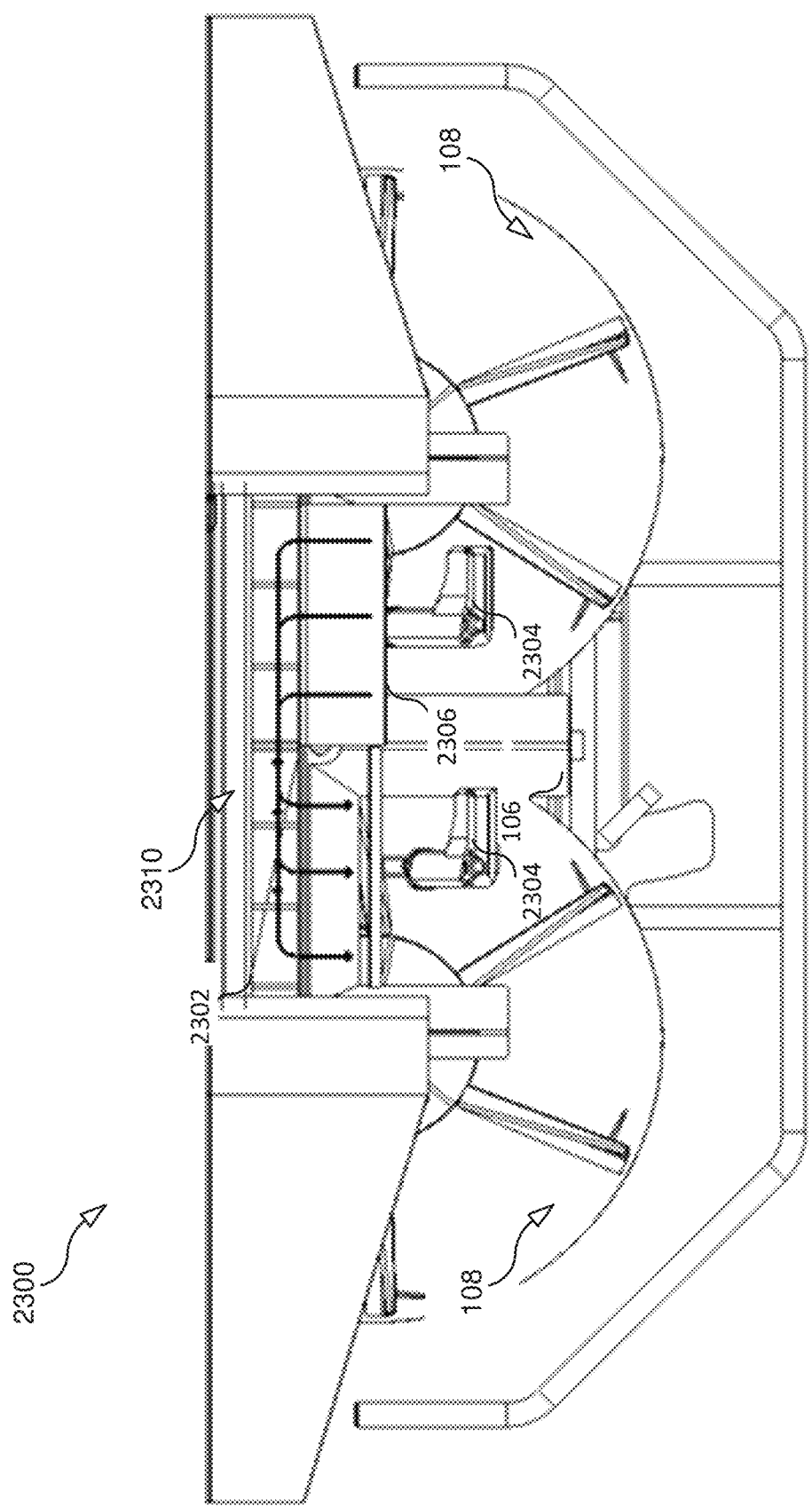
FIGS. 23-28 illustrate an alternative embodiment of a dry product spreader using mechanical conveyance to provide for swath control.
Figure 24:
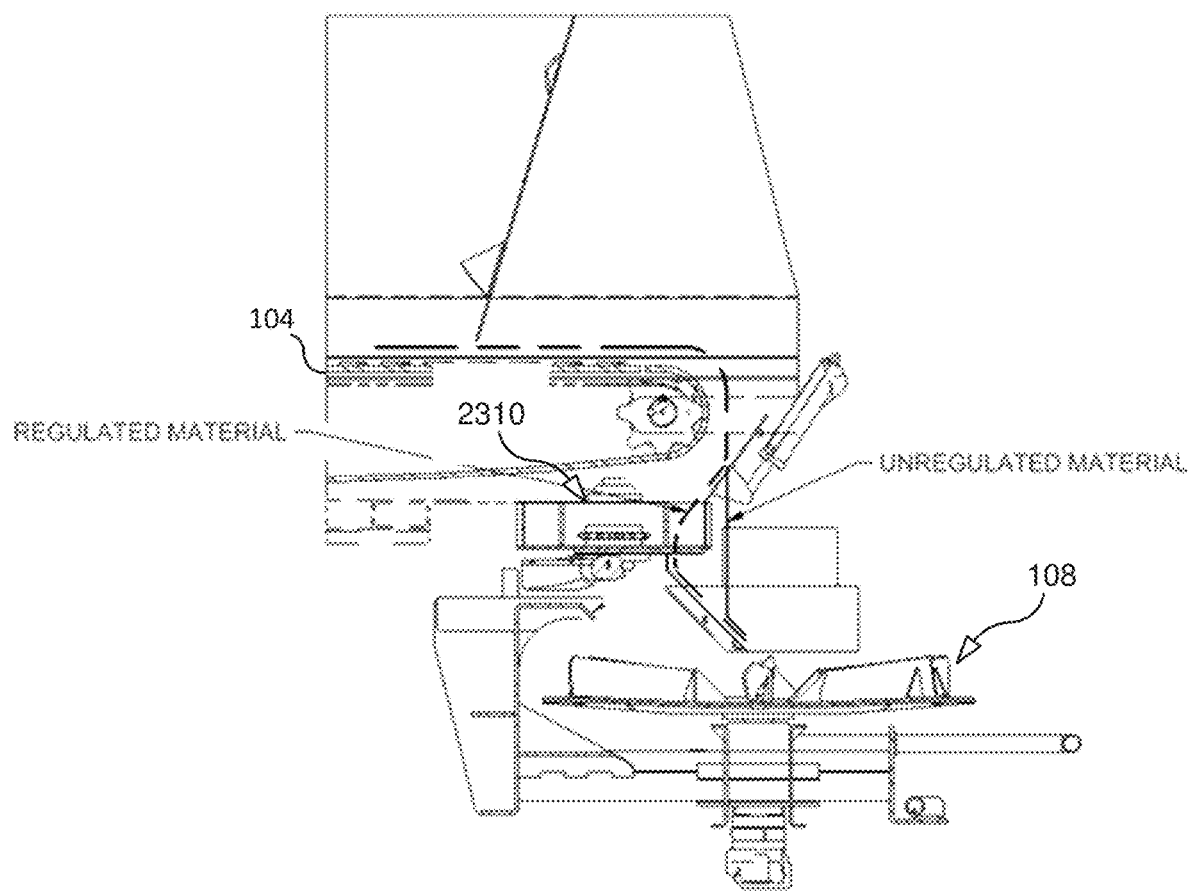
Figure 25:
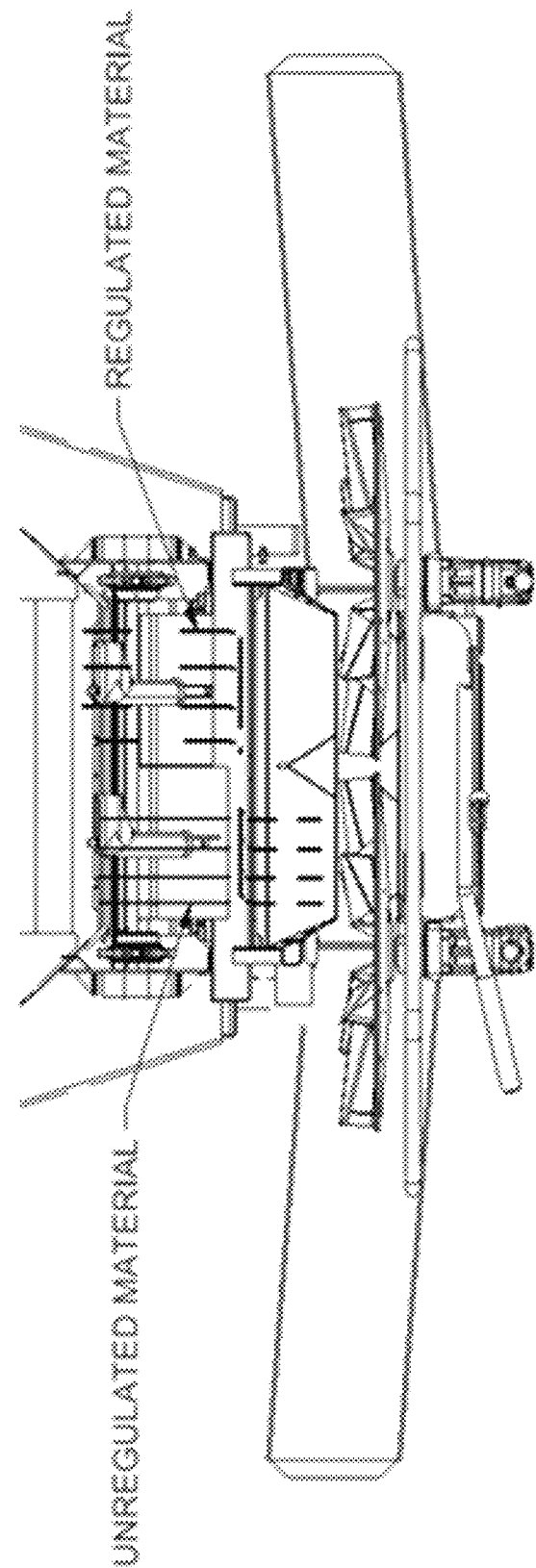
Figure 26:
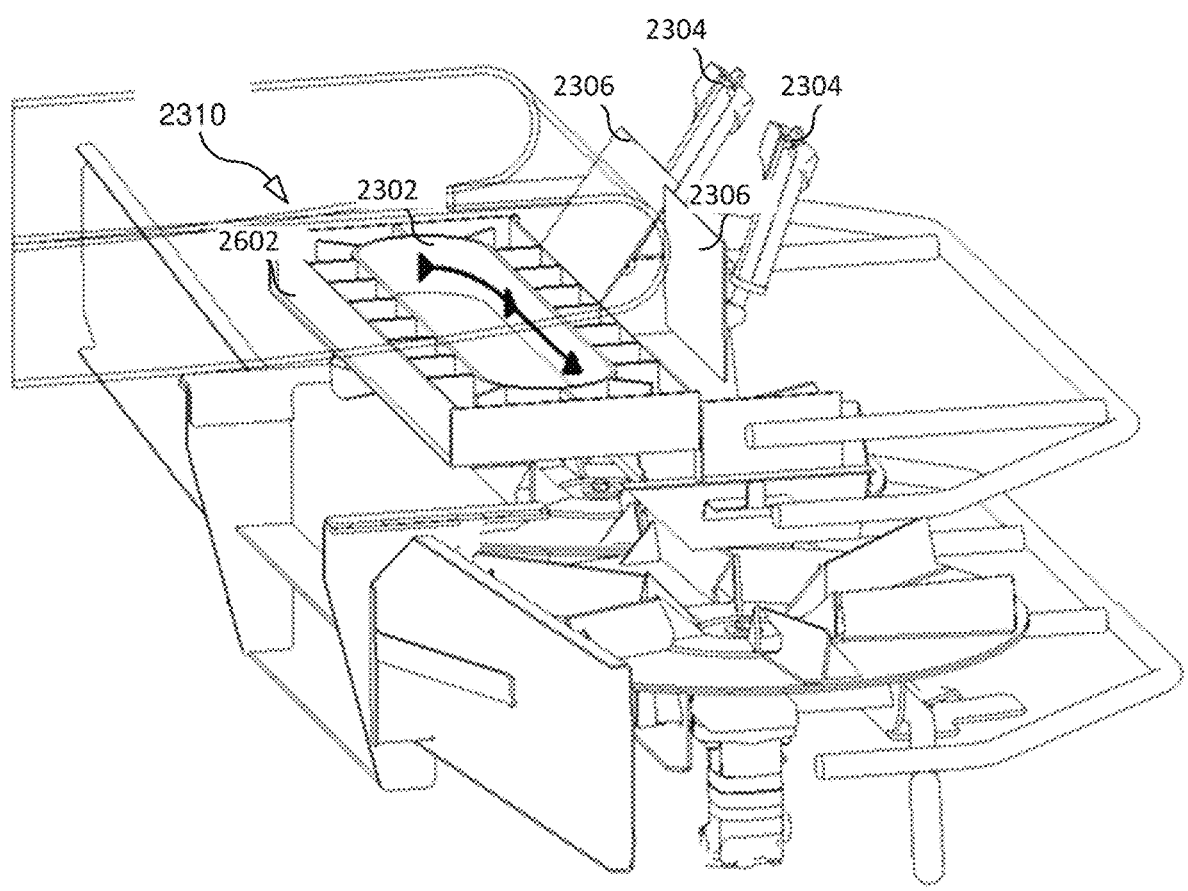
Figure 27:
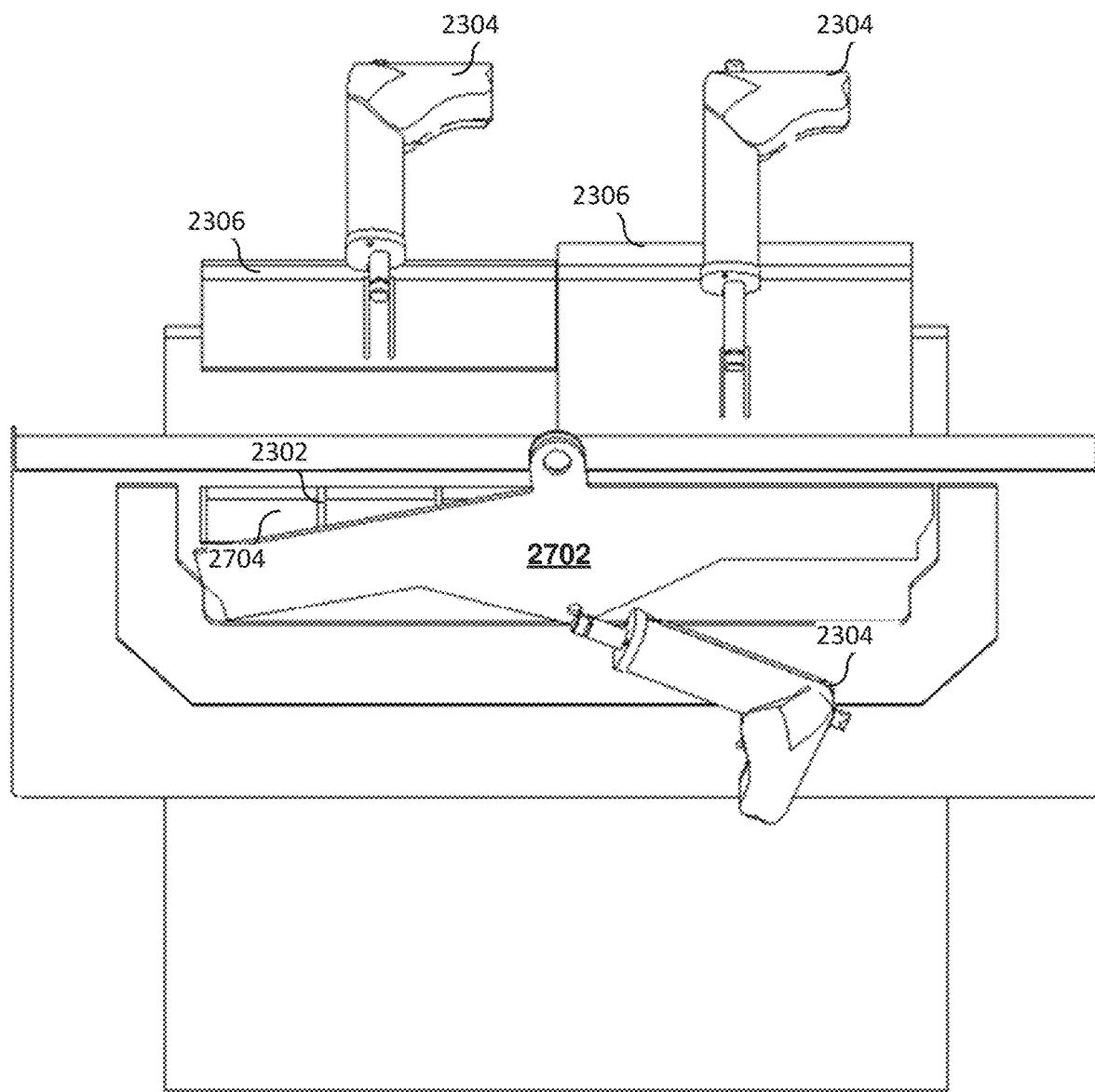
Figure 28:
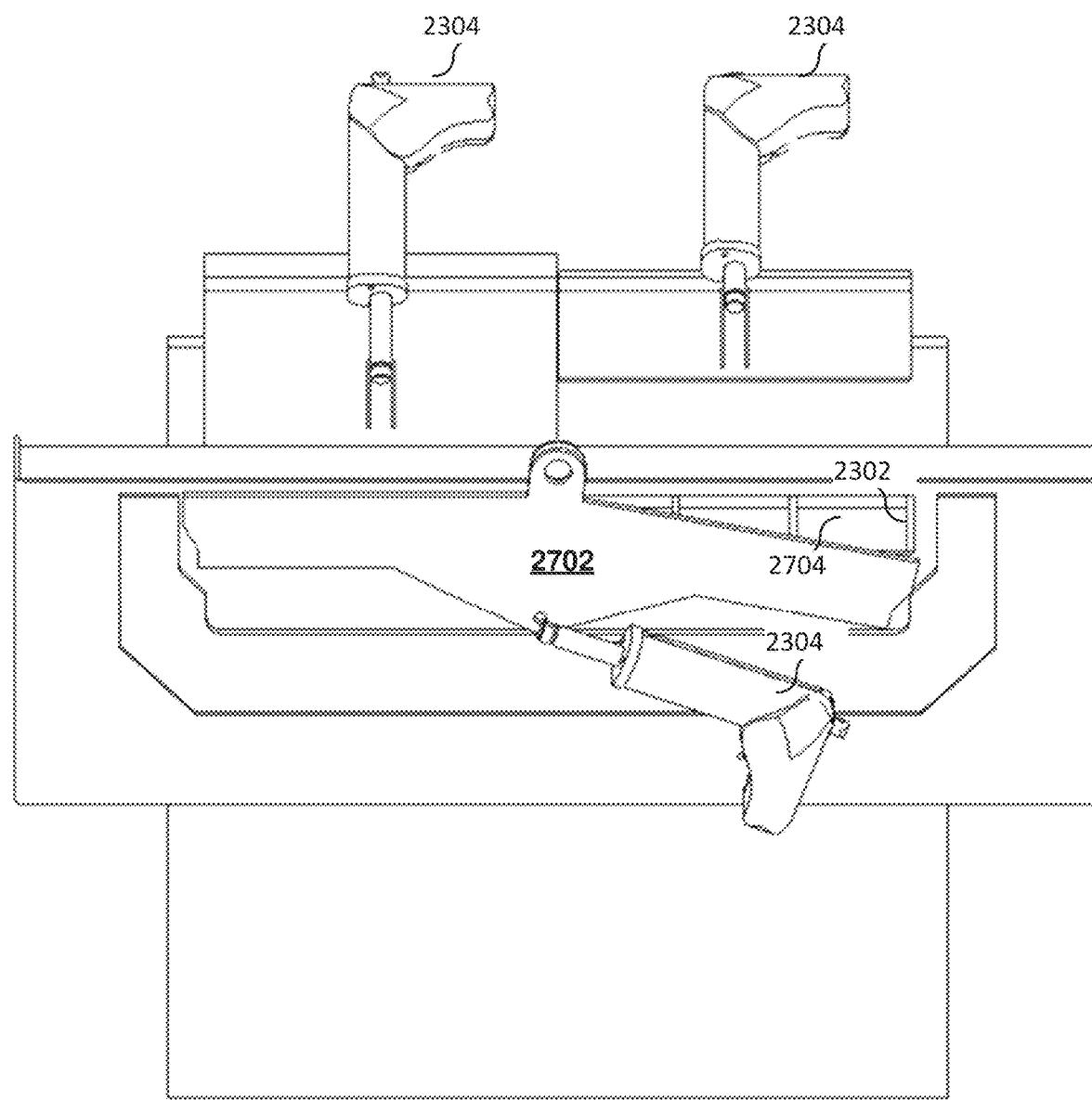

FIGS. 23-28 illustrate an alternative embodiment of a dry product spreader using mechanical conveyance to provide for swath control. As shown, dry product spreader 2300 includes an alternate conveyance system 2310 that uses a combination of mechanical diverters 2306 and a transverse cross conveyor 2302 to regulate the material from half of the belt width to create two sections. This embodiment includes an electric or hydraulic actuator 2304 that, when activated, diverts the material dropping off of the belt 104 in the regulated section forward into a transverse conveyor belt 2302 that then moves the regulated material transversely to the non-regulated section before dropping into the material flow divider 106. An auger, or other means of mechanical conveyance of material, may be used in place of the transverse cross conveyor belt 2302 to move the regulated material transversely. In addition to the rear diverters 2306 that direct the regulated material forward, there is a pivotable deflector 2702 (see FIG. 27) underneath the transverse conveyor belt 2302 to allow the regulated material to drop out on the left hand or right hand side depending on which section is being regulated. The transverse conveyor belt 2302 may include conveyor housing 2602 and a conveyor opening 2704. The profile of this pivotable deflector 2702 is such that the bottom opening 2704 of the transverse conveyor belt 2302 increases the further away from the centerline of the dry product spreader to allow for a uniform distribution of regulated material across the regulated section. FIGS. 23-27 show the right hand section being regulated and FIG. 28 shows the left hand section being regulated. As shown in FIG. 23, the regulated material from the right hand side of the belt is shown as solid lines and is directed forward into the cross conveyor 2302 and dropped down onto the left side of the material flow divider 106.

Figure 29:
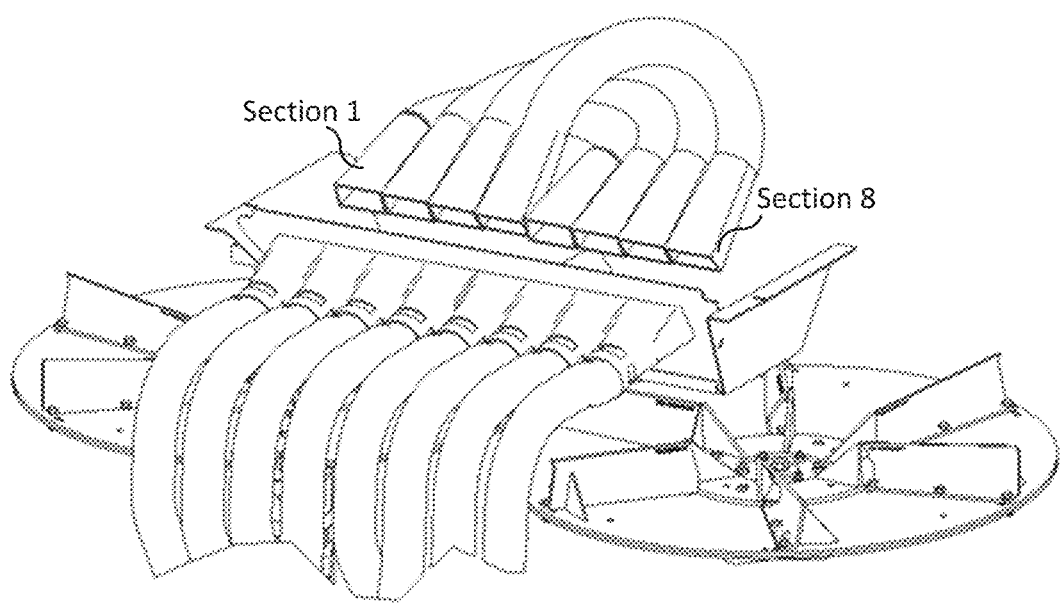
FIG. 29 illustrates an alternate embodiment of a distribution material manifold for a dedicated half width application broadcast spreader.

FIG. 29 illustrates an alternate embodiment of a distribution material manifold for a dedicated half width application broadcast spreader. Half width here means that half of the material waterfall is being sent through the material manifold to the other half of the material waterfall. This particular example requires the material waterfall be divided into an even number of sections. This example is 8 sections and utilizes 4 equal length tubes having similar routing. The sections may be numbered 1 through 8, left to right, as indicated in FIG. 29. Material entering section 1 would exit section 5, and vice versa, material entering section 5 would exit section 1. Similarly, material entering section 2 would exit section 6, and vice versa, and so on, with section 3 connected to section 7, and section 4 connected to section 8. The length and routing should be very similar to have equal air and material flow characteristics in each tube. Other connections and arrangements are possible, in order to achieve other broadcast spreading patterns.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A dry product spreader comprising:
a bin comprising a bin discharge opening, wherein the bin is capable of containing a dry product material;
a conveyor located at a bottom of the bin, wherein the conveyor is capable of discharging the dry product material from the bin through the bin discharge opening where the discharging of the dry product material from the bin through the bin discharge opening forms a dry product material stream, wherein the dry product material in the dry product material stream flows in a first direction;
one or more spinners for spreading the dry product material and positioned to receive the dry product material from the bin discharge opening;
a material conveyor to displace a portion of the dry product material received through the bin discharge opening before the dry product material reaches the one or more spinners such that the portion of the dry product material is displaced from the dry product material stream in a second direction different from the first direction; and
a distribution manifold configured to receive the portion of the dry product material displaced by the material conveyor;
wherein the distribution manifold is configured to return the portion of the dry product material displaced by the material conveyor to be spread by the one or more spinners such that the portion of the dry product material is returned to the dry product material stream.

2. The dry product spreader of claim 1, wherein the material conveyor comprises one or more air nozzles.

3. The dry product spreader of claim 2, wherein the distribution manifold comprises an air diffuser for diffusing air, the air diffuser situated toward a top of the distribution manifold.

4. The dry product spreader of claim 2, wherein the distribution manifold comprises a plurality of sections, each section being associated with one of the one or more air nozzles, such that the air nozzles of activated sections are capable of diverting the portion of the dry product material to one or more non-activated sections of the distribution manifold.

5. The dry product spreader of claim 2, wherein the material conveyor further comprises a fan.

6. The dry product spreader of claim 5, wherein the fan is a type of squirrel cage fan.

7. The dry product spreader of claim 5, wherein the fan is a single centrifugal fan.

8. The dry product spreader of claim 5, wherein the fan is attached to an air distribution box that has nozzle control valves and supply lines leading to each of the one or more air nozzles.

9. The dry product spreader of claim 1, further comprising:
one or more additional bins, each comprising additional bin discharge openings, and each capable of containing additional dry product materials;
one or more additional conveyors corresponding to the one or more additional bins and located at a bottom of the respective additional bin, wherein the one or more additional conveyors are capable of discharging the additional dry product materials from the one or more additional bins through the one or more additional bin discharge openings; and
wherein the material conveyor is further configured to displace a portion of the additional dry product materials received through the one or more additional bin discharge openings before the additional dry product materials reach the one or more spinners.

10. The dry product spreader of claim 1, further comprising a material flow divider that receives dry product material from the conveyor and distributes the dry product material toward the one or more spinners.

11. The dry product spreader of claim 2, wherein the one or more air nozzles are angled upwardly relative to a horizontal plane.

12. The dry product spreader of claim 11, wherein each of the one or more air nozzles are angled upwardly relative to a horizontal plane at an angle between 10° to 20.

13. The dry product spreader of claim 1, wherein the distribution manifold is positioned substantially vertically.

14. The dry product spreader of claim 1, wherein the distribution manifold is angled at an angle of at least 30° relative to a horizontal axis.

15. The dry product spreader of claim 5, further comprising a valve for each of the one or more air nozzles for controlling the airflow.

16. The dry product spreader of claim 15, wherein the valve comprises one of a common ball valve, a butterfly valve, and a knife valve.

* * * * *